(12) United States Patent
Kariatsumari et al.

(10) Patent No.: US 7,960,940 B2
(45) Date of Patent: Jun. 14, 2011

(54) MOTOR CONTROL DEVICE

(75) Inventors: Yuji Kariatsumari, Kashiwara (JP);
Masaya Segawa, Yamatokoriyama (JP)

(73) Assignee: JTEKT Corporation, Osaka-shi (JP)

( * ) Notice: Subject to any disclaimer, the term of this patent is extended or adjusted under 35 U.S.C. 154(b) by 429 days.

(21) Appl. No.: 12/170,085

(22) Filed: Jul. 9, 2008

(65) Prior Publication Data
US 2009/0015182 A1   Jan. 15, 2009

(30) Foreign Application Priority Data

Jul. 10, 2007   (JP) .................................. 2007-181258
Aug. 7, 2007   (JP) .................................. 2007-205655

(51) Int. Cl.
*H02P 23/00* (2006.01)
(52) U.S. Cl. .............. 318/807; 318/400.01; 318/400.02; 318/767
(58) Field of Classification Search ............. 318/400.01, 318/400.02, 767, 807; 307/151; 363/1–12, 363/150
See application file for complete search history.

(56) References Cited

U.S. PATENT DOCUMENTS

| | | | | |
|---|---|---|---|---|
| 5,652,495 A * | 7/1997 | Narazaki et al. | ............... | 318/716 |
| 6,462,492 B1 * | 10/2002 | Sakamoto et al. | ....... | 318/400.32 |
| 6,876,169 B2 * | 4/2005 | Gallegos-Lopez et al. | ... | 318/701 |
| 6,927,551 B2 * | 8/2005 | Yoshimoto | .................... | 318/715 |
| 6,965,212 B1 * | 11/2005 | Wang et al. | .................. | 318/700 |
| 7,622,877 B2 * | 11/2009 | Schulz et al. | ................. | 318/432 |
| 2003/0062868 A1 * | 4/2003 | Mir et al. | ....................... | 318/599 |
| 2003/0222612 A1 * | 12/2003 | Matsushita | .................... | 318/437 |
| 2005/0045414 A1 * | 3/2005 | Takagi et al. | ................. | 180/446 |
| 2006/0266575 A1 * | 11/2006 | Nagase et al. | ................ | 180/446 |
| 2007/0222409 A1 * | 9/2007 | Kariatsumari et al. | ....... | 318/807 |
| 2009/0069980 A1 * | 3/2009 | Sakamaki | ....................... | 701/42 |

FOREIGN PATENT DOCUMENTS

| | | |
|---|---|---|
| EP | 1 871 001 A1 | 12/2007 |
| JP | 59-96888 | 6/1984 |
| JP | 3-70498 | 3/1991 |
| JP | 2002-238163 | 8/2002 |
| JP | 2004-23843 | 1/2004 |
| JP | 2006-352957 | 12/2006 |
| WO | WO 2006/109809 A1 | 10/2006 |

* cited by examiner

*Primary Examiner* — Walter Benson
*Assistant Examiner* — Kawing Chan
(74) *Attorney, Agent, or Firm* — Oblon, Spivak, McClelland, Maier & Neustadt, L.L.P.

(57) ABSTRACT

A motor control device for controlling a d-axis current and a q-axis current on dq coordinates to control a motor, includes a q-axis current command value setting unit which sets a q-axis current command value, an upper limit/lower limit setting unit which sets an upper limit and a lower limit of the q-axis current, a comparing unit which compares the q-axis current command value set by the q-axis current command value setting unit and the upper limit and the lower limit set by the upper limit/lower limit setting unit, a q-axis current command value limiting unit which puts a limit on the q-axis current command value in accordance with a comparison result by the comparing unit, and a d-axis current command value setting unit which sets a d-axis current command value on the basis of the q-axis current command value limited by the q-axis current command value limiting unit.

9 Claims, 10 Drawing Sheets

MOTOR CONTROL DEVICE

CROSS-REFERENCE TO RELATED APPLICATIONS

The present application is based on Japan Patent Application No. 2007-181258 filed on Jul. 10, 2007 and Japan Patent Application No. 2007-205655 filed on Aug. 7, 2007, the contents of which are incorporated herein for reference.

BACKGROUND

The present invention relates to a motor control device which determines a command value of a two-phase current in dq coordinates of a motor, and controls the motor on the basis of the command value.

Also, the present invention relates to a motor control device which carries out dead time control which simultaneously turns off upper switching elements and lower switching elements of a driving circuit for driving the motor.

An electric power steering apparatus which transmits a driving force generated by a motor to a steering mechanism to assist in steering is known. The electric power steering apparatus includes a torque sensor which detects a steering torque applied to a steering wheel, and a motor control device which controls the motor on the basis of the steering torque detected by the torque sensor.

As the motor, for example, a three-phase DC brushless motor is applied. The motor control device carries out sinusoidal driving which applies a voltage which varies sinusoidally to each phase of a stator, on the basis of the electric angle of a rotor. More specifically, for example, the motor control device sets a command value of a two-phase current in dq coordinates, i.e., a d-axis current command value and a q-axis current command value, on the basis of the steering torque detected by the torque sensor. Moreover, the motor control device detects a d-axis current and a q-axis current which actually flows through the motor, obtains deviations of the d-axis current and the q-axis current concerning the respective command values, and calculates a d-axis voltage command value $V_d$ and a q-axis voltage command value $V_q$ corresponding to the deviations, respectively. Then, the motor control device converts the d-axis voltage command value $V_d$ and the q-axis voltage command value $V_q$ to three-phase (U-phase, V-phase, and W-phase) voltage values, and applies the voltages with these values to the phase of the motors, respectively.

In a low-and-middle speed rotation region, a required torque can be generated from the motor by setting the d-axis current command value to zero while setting the q-axis current command value to a value corresponding to the steering torque. However, in a high speed rotation region, an enough output (torque) of the motor is not generated since a back electromotive force is generated. In order to increase the output of the motor, the d-axis current command value is set to a significant value other than zero, and the magnetic-flux weakening control, which applies a current in a direction in which the magnetic flux on the d-axis is weakened, is carried out.

On the other hand, in order to set the voltage of each phase to a sinusoidal wave, it is necessary to set the amplitude of each phase voltage to less than half of the a source voltage $E_d$, and it is necessary that the following Expression (P1) is satisfied concerning a d-axis voltage $V_d$ and a q-axis voltage $V_q$ (WO2006/109809).

$$\sqrt{(V_d^2 + V_q^2)} \leq E_d\sqrt{3}/2\sqrt{2} \quad (P1)$$

Accordingly, depending on the d-axis current command value and the q-axis current command value, the d-axis voltage $V_d$ and the q-axis voltage $V_q$ may not satisfy the condition of the above Expression (P1), and thus the sinusoidal driving may become impossible. For this reason, vibration is generated in the motor, and this vibration is transmitted to a steering wheel via the steering mechanism. As a result, the vibration leads to aggravation of a steering feeling.

Therefore, in WO2006/109809, the q-axis voltage command value $V_q$ is limited so that the condition of the above Expression (P1) is satisfied.

A driving current is supplied to the motor from a driving circuit constituted by an inverter circuit. The driving circuit includes three series circuits so as to correspond to a U-phase, a V-phase, and a W-phase, respectively. Each of the series circuits has an upper switching element and a lower switching. The series circuits are connected in parallel to a power source (battery). Also, each of U-phase, V-phase, and W-phase armature windings of the motor is connected between the upper switching element and the lower switching element in each of the three series circuits.

The motor control device applies a PWM (Pulse Width Modulation) control signal to the driving circuit, and turns on/off the upper switching element and the lower switching element in each of the three series circuits by the PWM control. Also, as the duty ratio of a PWM control signal supplied to the upper switching element is properly controlled according to voltage command values, U-phase, V-phase, and W-phase voltages change sinusoidally such that the sinusoidal driving is carried out.

When the PWM driving is carried out, for the purpose of preventing short-circuiting when ON/OFF of the upper switching element and the lower switching element are switched, dead time during which both the switching elements are turned off temporarily is set (JP-A-2006-352957). This is called as the dead time control. For this dead time control, voltages to be applied to the U-phase, V-phase, and W-phase become lower than the command values.

In this case, by the action of a feedback loop including a PI (Proportional Integration) control unit, etc, the d-axis voltage command value and the q-axis voltage command value are increased, and a voltage drop resulting from the dead time control is corrected. As a result, there is a fear that the condition of the above Expression (P1) is not satisfied, and thereby, the sinusoidal driving can not be carried out. For this reason, vibration is generated in the motor, and this vibration is transmitted to the steering wheel via the steering mechanism, which leads to aggravation of a steering feeling.

Meanwhile, even in WO2006/109809, the problem about the vibration of the motor cannot also be solved.

That is, the d-axis voltage command value and the q-axis voltage command value are increased, and consequently, a situation in which the q-axis voltage command value is limited is easily brought about.

In the situation in which the q-axis voltage command value is limited, a q-axis current $i_q$ becomes variable. As a result, the torque generated by the motor may fluctuate, the vibration of the motor may be generated, and further a steering wheel may be vibrated. That is, in a high-speed rotation region and a high current value region where the q-axis voltage command value is limited, the q-axis current $i_q$ compulsorily becomes smaller than a targeted value if the q-axis voltage command value is limited. On the other hand, since the d-axis voltage includes a term having the q-axis current $i_q$ (refer to Expression (7) to be described later) and a term having the d-axis current $i_d$, the d-axis current $i_d$ ($\leq 0$) will have an absolute value which is greater than a targeted value as the q-axis current $i_q$ becomes smaller. Also, as the absolute value of the d-axis current $i_q$ becomes larger, a margin is given to the q-axis voltage (refer to Expression (8) to be described later), and an element which can make large the q-axis current $i_q$ is generated. Accordingly, the motor control device will make large the q-axis current $i_q$.

In the situation where the q-axis current command value is limited in this way, the d-axis current $i_d$ and the q-axis current $i_q$ are determined while they interfere with each other on the dq axes. Also, the feedback loop will set voltage command values for correcting the d-axis current $i_d$ and the q-axis current $i_q$ which are determined in the course of the loop to the d-axis current command value and the q-axis current command value. In this way, the q-axis current $i_q$ becomes variable, and minute vibration is generated in the motor, which will cause an uncomfortable steering feeling.

SUMMARY

Thus, the object of the invention is to provide a motor control device capable of attaining an increase in output while suppressing the vibration of a motor, for example, the vibration of the motor result from a voltage fluctuation caused by the influence of the dead time control.

In order to achieve the above object, according to the present invention, there is provided a motor control device for controlling a d-axis current and a q-axis current on dq coordinates to control a motor, comprising:

a q-axis current command value setting unit which sets a q-axis current command value;

an upper limit/lower limit setting unit which sets an upper limit and a lower limit of the q-axis current;

a comparing unit which compares the q-axis current command value set by the q-axis current command value setting unit and the upper limit and the lower limit set by the upper limit/lower limit setting unit;

a q-axis current command value limiting unit which puts a limit on the q-axis current command value in accordance with a comparison result by the comparing unit; and a d-axis current command value setting unit which sets a d-axis current command value, on the basis of the q-axis current command value which is limited by the q-axis current command value limiting unit.

According to the configuration, the q-axis current command value, and the upper limit and lower limit of the q-axis current are compared, and a limit is put on the q-axis current command value according to the comparison result. Also, a d-axis current command value corresponding to the q-axis current command value to which this limit is put is set. In this way, since a limit is put on the q-axis current command values in advance, and the d-axis current command value is set accordingly, the conditions to be satisfied by the d-axis voltage and the q-axis voltage can be satisfied reliably. Moreover, since a configuration in which the q-axis current command value is limited in advance is provided, there is no fear that the q-axis current command value becomes variable, unlike the case where the voltage command value is not limited afterwards. Thereby, while any vibration can be kept or prevented from being generated in the motor, the magnetic-flux weakening control by the d-axis current can be carried out, thereby attaining an increase in output particularly in the high-speed rotation region.

Preferably, the upper limit/lower limit setting unit sets the upper limit and the lower limit in accordance with a rotational angular velocity of the motor.

By the above configuration, an excessive limit can be kept from being put on the q-axis current command value, and the output of the motor can be more efficiently increased in a range in which the vibration of the motor is not generated.

Here, it is preferable that, the upper limit/lower limit setting unit determines the upper limit so as to satisfy the following Expression (A), and determines the lower limit so as to satisfy the following Expression (B); wherein:

$$i_{qa\_up\,lim} \leq \frac{-E - \sqrt{E^2 - DF}}{D} \quad (A)$$

$$i_{qa\_down\,lim} \geq \frac{-E + \sqrt{E^2 - DF}}{D} \quad (B)$$

$$D = R^2(L_d - L_q)^2\omega^2 - (R^2 + L_d^2\omega^2)(R^2 + L_q^2\omega^2),$$
$$E = R(L_d - L_q)L_d\varphi\omega^3 - (R^2 + L_d^2\omega^2)R\varphi\omega, \text{ and}$$
$$F = -R^2\varphi^2\omega^2 + (R^2 + L_d^2\omega^2)V_{lim}^2,$$

$i_{qa\_up\,lim}$ is a q-axis current upper limit, $i_{qa\_down\,lim}$ is a q-axis current lower limit, R is a stator winding resistance of the motor, φ is a magnetic flux on dq coordinates calculated from the interlinking magnetic flux of a stator caused by a field, ω is the rotational angular velocity at an electric angle of the motor, $L_d$ is d-axis inductance, $L_q$ is q-axis inductance, and $V_{lim}$ is a limit voltage in the dq coordinates where sinusoidal driving is allowed.

According to the configuration, a limit is put on the q-axis current command value in advance so that a d-axis voltage and a q-axis voltage satisfy the conditions for sinusoidal driving. The d-axis current command value is determined according to the limited q-axis current command value. Thereby, the vibration of the motor can be suppressed or prevented more reliably.

Here, it is preferable that, the upper limit/lower limit setting unit determines the upper limit in accordance with the following Expression (A1), and determines the lower limit in accordance with the following Expression (B1), wherein:

$$i_{qa\;up\,lim} = \frac{-E - \sqrt{E^2 - DF}}{D} \quad (A1)$$

$$i_{qa\;down\,lim} = \frac{-E + \sqrt{E^2 - DF}}{D} \quad (B1)$$

According to the configuration, a maximum q-axis current command value is obtained in advance in a range in which the d-axis voltage and the q-axis voltage satisfy the conditions for sinusoidal driving, and the d-axis current command value is set according to the q-axis current command value. Thereby, while the vibration of the motor is suppressed or prevented reliably, the output of the motor can be increased to a maximum extent.

Here, it is preferable that, the upper limit/lower limit setting unit determines the upper limit so as to be smaller than a value obtained by the Expression (A1) and determines the lower limit so as to be greater than a value obtained by the Expression (B1), in a rotational angular velocity region where an absolute value of the rotational angular velocity of the motor exceeds a predetermined value.

In the configuration, in a high-speed rotation region, a large limit is put on the q-axis current command value. Thereby, since the rotational angular velocity of the motor can be kept or prevented from becoming excessive, for example the disadvantage that a variable for control may overflow can be avoided effectively.

Here, it is preferable that, the d-axis current command value setting unit sets a d-axis current command value in accordance with the following Expression (C), wherein:

$$\frac{-B - \sqrt{B^2 - AC}}{A} \leq i_{da}^* \leq \frac{-B + \sqrt{B^2 - AC}}{A} \quad (C)$$

$$A = R^2 + L_d^2 \omega^2,$$

$$B = R(L_d - L_q)\omega i_{qa}^* + L_d \varphi \omega^2, \text{ and}$$

$$C = (R^2 + L_q^2 \omega^2) i_{qa}^{*2} + 2R\varphi \omega i_{qa}^* + \varphi^2 \omega^2 - V_{lim}^2,$$

$i_{da}^*$ is a d-axis current command value, and
$i_{qa}^*$ is a q-axis current command value.

According to the configuration, since the d-axis current command value can be set in a range where the sinusoidal driving is allowed, while the vibration of the motor is suppressed, the output of the motor can be increased.

Here, it is preferable that, the d-axis current command value setting unit sets a d-axis current command value in accordance with the following Expression (C1), $$i_{da}^* = \frac{-B + \sqrt{B^2 - AC}}{A}. \quad (C1)$$

According to the configuration, the absolute value of the d-axis current command value can be set to as small a value as possible. Thereby, while the vibration of the motor is suppressed, the output of the motor can be increased effectively.

Preferably, the motor control device further comprising:
a command value calculating unit which calculates a command value for carrying out magnetic-flux weakening control of the motor on the basis of a limit voltage, wherein a voltage fluctuation resulting from dead time control which simultaneously turns off upper switching elements and lower switching elements of a driving circuit for driving the motor is added to the limit voltage; and
a control signal generating unit which generates a control signal for carrying out ON/OFF control and the dead time control of the upper switching elements and the lower switching elements of the driving circuit.

According to the configuration, a command value for carrying out magnetic-flux control of the motor is determined on the basis of the limit voltage to which a voltage fluctuation (fluctuation of a motor application voltage) resulting from the dead time control. Also, ON/OFF control and the dead time control of the upper switching elements and the lower switching elements is carried as a control signal based on the command value is input to the driving circuit from the control signal generating unit. Accordingly, since the command value is determined in consideration of the influence of the dead time control in advance, a voltage to be applied to the motor can be kept or prevented from exceeding the limit voltage. Thereby, while any vibration is kept or prevented from being generated in the motor, the output of the motor can be increased by the magnetic-flux weakening control.

For example, the motor control device may include a current detecting unit which detects a current flowing through the motor, and the command value calculating unit may set a voltage command value on the basis of a current value detected and fed back by the current detecting unit. Such feedback loop functions to set the voltage command value so as to compensate a voltage fluctuation by the dead time control. Even in this case, since the voltage fluctuation by the dead time control is added to the limit voltage in advance, a voltage to be applied to the motor can be kept or prevented from exceeding the limit voltage.

Preferably, the limit voltage is smaller than or equal to an upper limit for driving the motor sinusoidally. Thereby, since the motor can be reliably driven sinusoidally without depending on the dead time control, the vibration of the motor can be suppressed or prevented more reliably.

Preferably, the motor is a three-phase motor. The limit voltage to which the voltage fluctuation resulting from the dead time control is added is a limit voltage in dq coordinates. The limit voltage has a value obtained by subtracting $2\sqrt{6}/3$ times or more a fluctuation absolute value of each phase voltage resulting from the dead time control, from a limit voltage in the dq coordinates to which the voltage fluctuation resulting from the dead time control is not added.

The influence of any fluctuation of each phase voltage resulting from the dead time control is estimated by $2\sqrt{6}/3$ times the absolute value of a voltage fluctuation in the dq coordinates. Thus, if a limit voltage in dq coordinates is determined by subtracting $2\sqrt{6}/3$ times or more the fluctuation absolute value of each phase voltage resulting from the dead time control, from a limit voltage (imaginary limit voltage) in the dq coordinates when the voltage fluctuation resulting from the dead time control is not added, a voltage to be applied to the motor can be kept or prevented from exceeding the limit voltage. Thereby, the vibration of the motor can be suppressed.

Preferably, the q-axis current command value limiting unit puts the limit on the q-axis current command value set by the q-axis current command value setting unit, on the basis of the limit value to which the voltage fluctuation resulting from the dead time control is added.

According to the configuration, a limit is put on the q-axis current command value on the basis of the limit voltage, and a d-axis current command value corresponding to the q-axis current command value on which this limit is put. In this way, since a limit is put on the q-axis current command value in advance, and a d-axis current command value is set accordingly, the condition (limit voltage) which the d-axis voltage and the q-axis voltage satisfy can be satisfied reliably. Moreover, since a configuration in which the q-axis current command value is limited in advance is provided, there is no fear that the q-axis current becomes variable unlike WO2006/109809 in which the voltage command value is limited afterwards. Thereby, while any vibration can be kept or prevented from being generated in the motor, the magnetic-flux weakening control by the d-axis current be carried out, thereby attaining an increase in output particularly in the high-speed rotation region.

Preferably, the motor control device, further comprising:
a limit voltage setting unit which sets the limit value to which the voltage fluctuation resulting from the dead time control is added, on the basis of an input voltage to the driving circuit.

According to the configuration, since the limit voltage is set according to an input voltage to the driving circuit, a proper limit voltage is set without depending on any fluctuation, etc. of a power source voltage. Thereby, the vibration of the motor can be suppressed or prevented more reliably.

Moreover, since the limit voltage is set on the basis of an input voltage to the driving circuit, even if electrical components, such as a relay and a coil, are interposed between a power source the driving circuit, the influence under a voltage drop caused by these electrical components can be eliminated. Accordingly, setting of a proper limit voltage is ensured.

BRIEF DESCRIPTION OF THE DRAWINGS

The above objects and advantages of the present invention will become more apparent by describing in detail preferred exemplary embodiments thereof with reference to the accompanying drawings, wherein.

DETAILED DESCRIPTION OF EXEMPLARY EMBODIMENTS

Hereinafter, embodiments of the invention will be described in detail with reference to the accompanying drawings.

Figure 1:
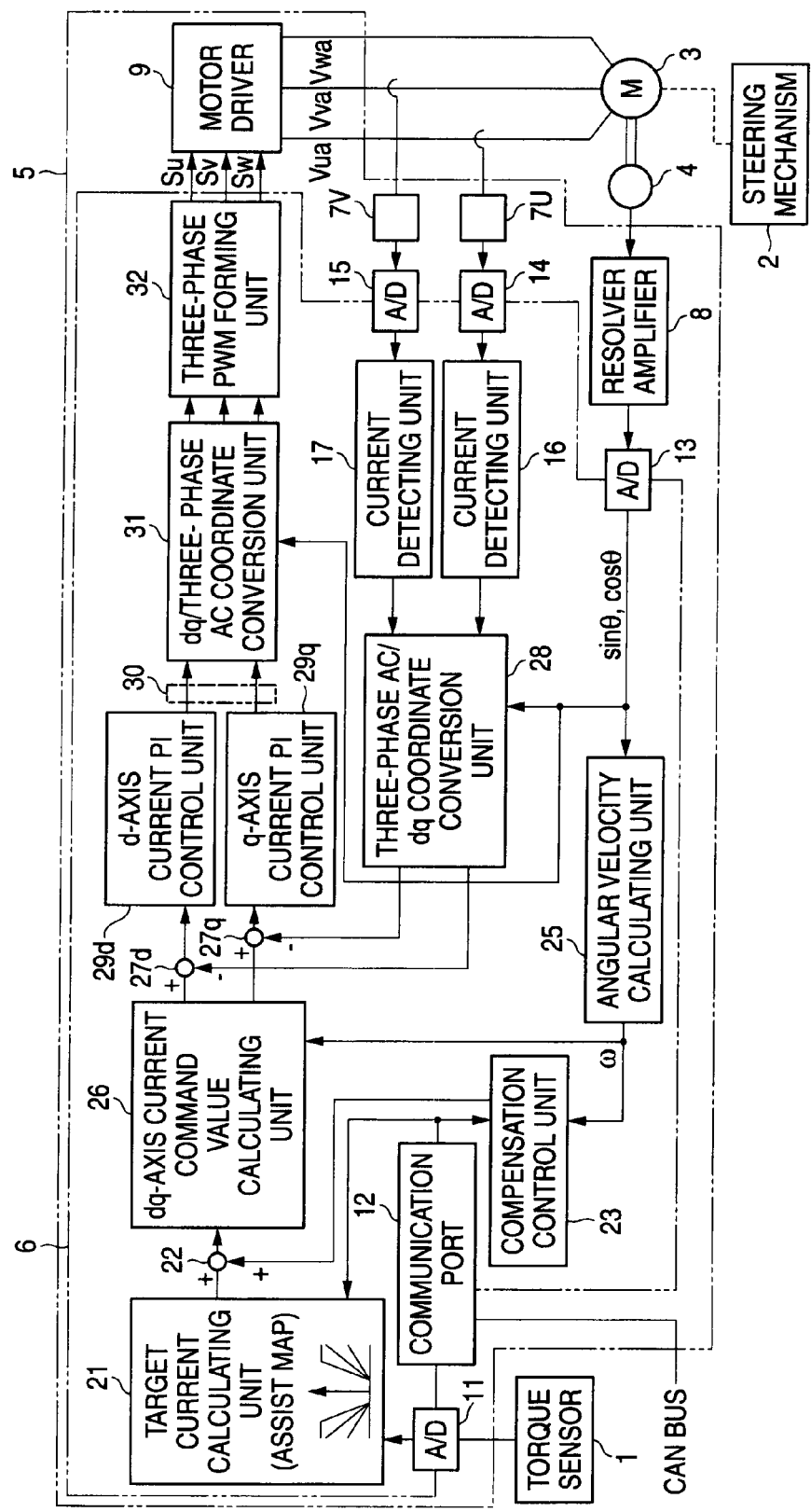
FIG. 1 is a block diagram illustrating the electrical configuration of an electric power steering apparatus according to a first embodiment of the invention.

FIG. 1 is a block diagram illustrating the electrical configuration of an electric power steering apparatus according to the first embodiment of the invention. The electric power steering apparatus includes a torque sensor 1 which detects the steering torque applied to a steering wheel of a vehicle, an electric motor 3 which gives steering assist power to a steering mechanism 2 of the vehicle, and a motor control device (ECU: Electronic Control Unit) 5 which controls a driving of the electric motor 3. The motor control device 5 drives the electric motor 3 in response to the steering torque detected by the torque sensor 1 and vehicle speed information transmitted through an in-vehicle LAN (CAN bus) to realize the proper steering assist depending on steering situations. The electric motor 3 is a three-phase brushless DC motor in this embodiment.

The motor control device 5 includes a microcomputer 6 having a CPU, a RAM, and a ROM, motor current detecting circuits 7U and 7V which respectively detect a U-phase current $i_{ua}$ and a V-phase current $i_{va}$ flowing through the electric motor 3, a resolver amplifier 8 which amplifies the output signal of a resolver 4 serving as a rotor position sensor annexed to the electric motor 3, and a motor driver 9 which supplies electric power to the electric motor 3. The resolver amplifier 8 constitutes a signal output section along with the resolver 4, and processes a signal from the resolver 4 to output a sine signal sin θ and a cosine signal cos θ concerning the rotor rotation angle θ of the electric motor 3. The rotor rotation angle θ is the angle (electric angle) of a rotor (magnetic field) based on the position of a U-phase armature winding of the electric motor 3.

The microcomputer 6 fetches an output signal of the torque sensor 1 as the steering torque represented by digital data via an A/D conversion port 11, and fetches the vehicle speed information from the in-vehicle LAN via a communication port 12. Also, the microcomputer 6 sets a current command value of the electric motor 3 on the basis of the steering torque and vehicle speed, sets a voltage command value on the basis of this current command value, and output signals of the motor current detecting circuits 7U and 7V, and gives the voltage command value to the motor driver 9. Thereby, a proper voltage is applied to the electric motor 3 from the motor driver 9, and a sufficient torque required for power assist is generated from the electric motor 3.

The microcomputer 6 includes a plurality of function processing sections which are realized by a given program. The plurality of function processing section include a target current calculating unit 21 which calculates a target current value on the basis of steering torque and vehicle speed. A target current value output by the target current calculating unit 21 is input to an addition unit 22. Also, a correction value from a compensation control unit 23 for carrying out various kinds of compensation control is input to the addition unit 22. The correction value is added to the target current value so that a corrected target current value can be obtained.

The compensation control unit 23 includes, for example, a convergent correction unit, etc. which calculates a convergent correction value for improving the convergence of a steering wheel, and is adapted to calculate the correction value for correcting the target current value on the basis of the vehicle speed and the rotational angular velocity ω of the rotor of the electric motor 3 from the communication port 12.

The microcomputer 6 includes an angular velocity calculating unit 25 for calculating the rotational angular velocity ω (rotational angular velocity in the electric angle) of the rotor of the electric motor 3. The data from an A/D conversion port 13 for converting the output signal of the resolver amplifier 8 to digital data to fetch the converted data is input to the angular velocity calculating unit 25. The A/D conversion port 13 samples the output signal of the resolver amplifier 8 and converts the output signal to digital data, and generates digitalized sine signal sin θ and cosine signal cos θ.

The angular velocity calculating unit 25 may be configured so as to obtain the rotational angular velocity ω according to, for example, the following expression.

$$\omega = \Delta\theta \approx \sin \Delta\theta = \sin \theta_i \cos \theta_{i-1} - \cos \theta_i \sin \theta_{i-1}$$

where $\theta_i$ is a rotor rotation angle in a current sampling cycle, $\theta_{i-1}$ is a rotor rotation angle in a previous sampling cycle, and $$\Delta\theta = \theta_i - \theta_{i-1}$$

The microcomputer 6 further includes a dq-axis current command value calculating unit 26. The dq-axis current command value calculating unit 26 obtains a d-axis current command value $i_{da}*$ and a q-axis current command value $i_{qa}*$ in a dq coordinate system, on the basis of the corrected target current value. The dq coordinate system is a rotational orthogonal coordinate system having a d-axis and a q-axis which rotate in synchronization with the rotor of the electric motor 3. The d-axis is an axis along the direction of the magnetic flux formed by the rotor, and the q-axis is an axis in a phase which has shifted by $\pi/2$ with respect to the d-axis. Here, in this embodiment, the direction which orients from the N pole of the magnetic field (rotor) to the S pole thereof is set to the positive direction of the d-axis.

The dq-axis current command value calculating unit 26 sets d-axis current command value $i_{da}* \neq 0$ in a high-speed rotation region (for example, a rotational speed region exceeding 800 rpm) to carry out a magnetic-flux weakening control so that an output is increased.

The q-axis current command value $i_{qa}*$ calculated by the dq-axis current command value calculating unit 26 is input to a subtraction unit 27q. A q-axis current $i_{qa}$ obtained by carrying out three-phase AC/dq coordinate conversion of a U-phase current $i_{ua}$ and a V-phase current $i_{va}$ which the U-phase motor current detecting circuit 7U and the V-phase motor current detecting circuit 7V detect, respectively, is input to the subtraction unit 27q. The output signals of the U-phase motor current detecting circuit 7U and the U-phase motor current detecting circuit 7V are converted to digital data by A/D conversion ports 14 and 15 and fetched to the microcomputer 6. The fetched output signals are detected by current detecting units 16 and 17, and are then input to a three-phase AC/dq coordinate conversion unit 28. The three-phase AC/dq coordinate conversion unit 28 converts the U-phase current $i_{ua}$ and the V-phase current $i_{va}$ to the values of the dq coordinate system according to the following Expression (1).

$$\begin{bmatrix} i_{da} \\ i_{qa} \end{bmatrix} = \sqrt{\frac{2}{3}} \begin{bmatrix} \cos\theta & \cos\left(\theta - \frac{2\pi}{3}\right) & \cos\left(\theta - \frac{4\pi}{3}\right) \\ -\sin\theta & -\sin\left(\theta - \frac{2\pi}{3}\right) & -\sin\left(\theta - \frac{4\pi}{3}\right) \end{bmatrix} \begin{bmatrix} i_{ua} \\ i_{va} \\ i_{wa} \end{bmatrix} \quad (1)$$

(If $i_{wa} = i_{ua} - i_{wa}$ is inserted and arranged)

$$= \sqrt{2} \begin{bmatrix} -\sin\left(\theta - \frac{2\pi}{3}\right) & \sin\theta \\ -\cos\left(\theta - \frac{2\pi}{3}\right) & \cos\theta \end{bmatrix} \begin{bmatrix} i_{ua} \\ i_{va} \end{bmatrix}$$

The sine signal $\sin \theta$ and the cosine signal $\cos \theta$ from the A/D conversion port 13 are input to the three-phase AC/dq coordinate conversion unit 28 where the calculation according to the above Expression (1) is carried out using these signals.

The three-phase AC/dq coordinate conversion unit 28 supplies the q-axis current $i_{qa}$ obtained by the three-phase AC/dq coordinate conversion to the subtraction unit 27q. Accordingly, the deviation of the q-axis current $i_{qa}$ from the q-axis current command value $i_{qa}*$ is output from the subtraction unit 27q.

Meanwhile, the d-axis current command value $i_{da}*$ is input to a subtraction unit 27d. Also, the q-axis current command value $i_{qa}*$ calculated by the dq-axis current command value calculating unit 26 is input to a subtraction unit 27q. A d-axis current $i_{da}$ obtained by carrying out three-phase AC/dq coordinate conversion of a U-phase current $i_{ua}$ and a V-phase current $i_{va}$ according to the above Expression (1) in the three-phase AC/dq coordinate conversion unit 28 is input to the subtraction unit 27d. Thereby, the subtraction unit 27d outputs the deviation of the d-axis current $i_{da}$ from the d-axis current command value $i_{da}*$.

The deviations output from the subtraction units 27d and 27q are input to a d-axis current PI (Proportional Integration) control unit 29d and a q-axis current PI control unit 29q, respectively. The PI control units 29d and 29q respectively carry out PI calculation on the basis of the deviations input from the subtraction units 27d and 27q to obtain a d-axis voltage command value $V_{da}*$ and a q-axis voltage command value $V_{qa}*$.

The d-axis voltage command value $V_{da}*$ and the q-axis voltage command value $V_{qa}*$ are input to a dq/three-phase AC coordinate conversion unit 31. Further, the sine signal $\sin \theta$ and the cosine signal $\cos \theta$ fetched via the A/D conversion port 13 from the resolver amplifier 8 are input to the dq/three-phase AC coordinate conversion unit 31. Using these signals, the dq/three-phase AC coordinate conversion unit 31 converts the d-axis voltage command value $V_{da}*$ and the q-axis voltage command value $V_{qa}*$ to command values $V_{ua}*, V_{va}*$, and $V_{wa}*$ of a three-phase AC coordinate system in accordance with the Expression (2). Then, the obtained U-phase voltage command value $V_{ua}*$, V-phase voltage command value $V_{va}*$, and W-phase voltage command value $V_{wa}*$ are input to a three-phase PWM forming unit 32.

$$\begin{bmatrix} V_{ua}^* \\ V_{va}^* \\ V_{wa}^* \end{bmatrix} = \sqrt{\frac{2}{3}} \begin{bmatrix} \cos\theta & -\sin\theta \\ \cos\left(\theta - \frac{2\pi}{3}\right) & -\sin\left(\theta - \frac{2\pi}{3}\right) \\ \cos\left(\theta - \frac{4\pi}{3}\right) & -\sin\left(\theta - \frac{4\pi}{3}\right) \end{bmatrix} \begin{bmatrix} V_{da} \\ V_{qa} \end{bmatrix} \quad (2)$$

In addition, the W-phase voltage command value $V_{wa}*$ can be obtained by subtracting the U-phase voltage command value $V_{ua}*$ and the V-phase voltage command value $V_{va}*$ from zero, not by the calculation of the above Expression (2). By doing so, a burden to the CPU can be reduced. Of course, if the calculation speed of the CPU is sufficient, the W-phase voltage command value $V_{wa}*$ is calculated by the calculation according to the above Expression (2).

The three-phase PWM forming unit 32 produces PWM signals $S_u$, $S_v$, and $S_w$ corresponding to the U-phase voltage command value $V_{ua}*$, the V-phase voltage command value $V_{va}*$, and the W-phase voltage command value $V_{wa}*$, and outputs the produced PWM signals $S_u$, $S_v$, and $S_w$ to the motor driver 9. Thereby, voltages $V_{ua}$, $V_{va}$, and $V_{wa}$ corresponding to the PWM signals $S_u$, $S_v$, and $S_w$ are respectively applied to the U-phase, V-phase, and W-phase of the electric motor 3 from the motor driver 9, and the torque required for steering assist is generated from the electric motor 3.

Figure 2:
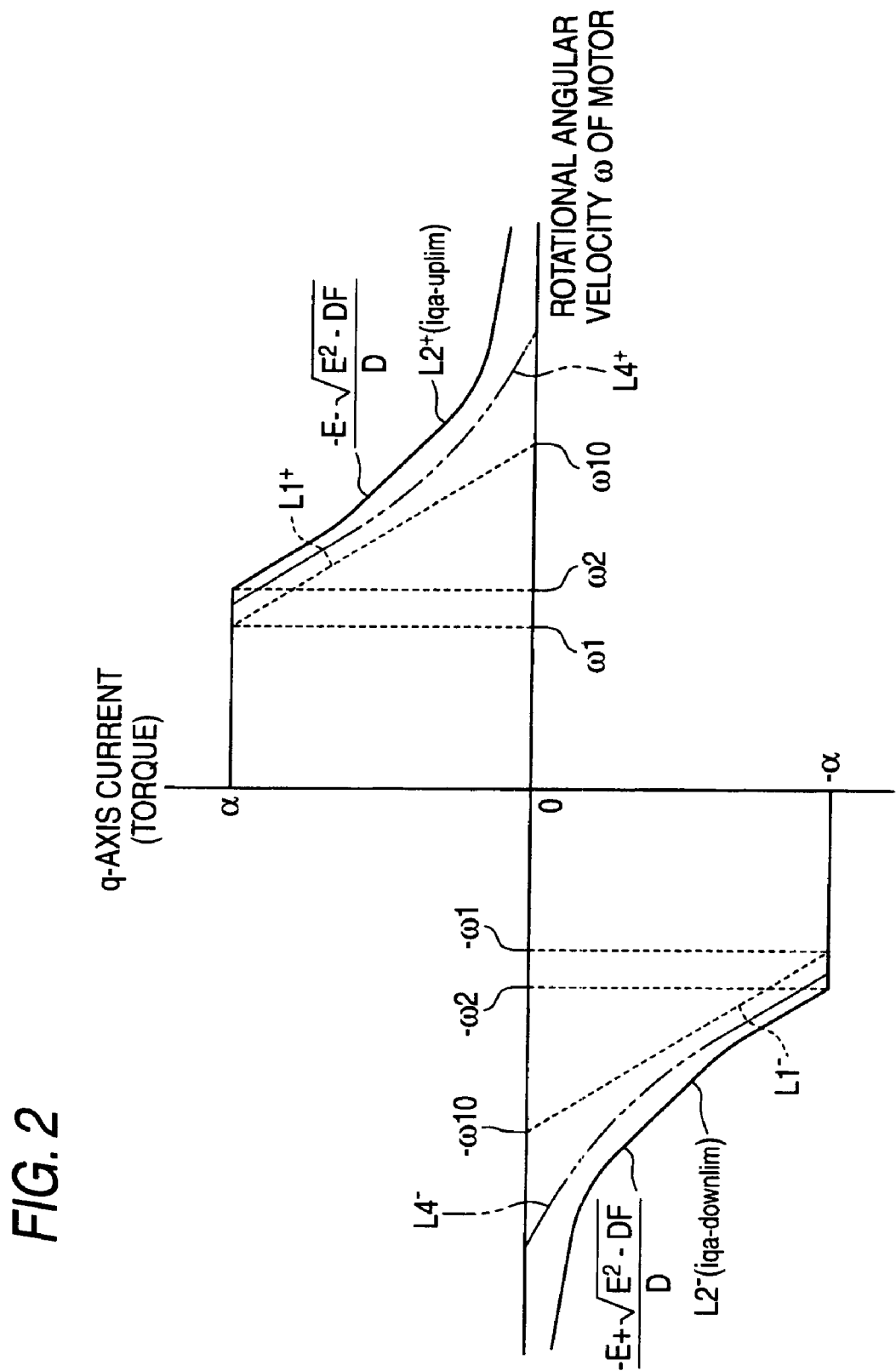
FIG. 2 is a view illustrating the operation of a dq-axis current command value calculating unit, and showing an upper limit $i_{qa\_uplim}$ and a lower limit $i_{qa\_downlim}$ of a q-axis current command value $i_{qa}^*$ corresponding to the rotational angular velocity of a motor.

FIG. 2 is a view illustrating the operation of the dq-axis current command value calculating unit 26, and showing an upper limit $i_{qa\_uplim}$ and a lower limit $i_{qa\_downlim}$ of the q-axis current command value $i_{qa}*$ corresponding to the rotational angular velocity $\omega$ of the motor. As the q-axis current command value $i_{qa}*$ is set between the upper limit $i_{qa\_uplim}$ and lower limit $i_{qa\_downlim}$, the sinusoidal driving of applying a sinusoidal wave to the U-phase, V-phase, and W-phase of the electric motor 3 is allowed.

When the magnetic-flux weakening control is not carried out, that is, when the d-axis current command value ida*=0 is set, the q-axis current command value iqa* is limited in accordance with characteristics L1+ and L1− denoted by broken lines. The characteristic L1+ represents an upper limit of setting a positive q-axis current command value iqa* in order to generate torque in the minus (−) direction (for example, clockwise direction), and the characteristic L1− represents a lower limit of setting a negative q-axis current command value iqa* in order to generate torque in the other direction (for example, counterclockwise direction). In this case, in a low-and-middle-speed rotation region where the absolute value of the rotational angular velocity ω of the motor is smaller than or equal to a first predetermined threshold ω1 (for example, ω1=800 rpm), there is obtained the characteristic that the upper limit and lower limit of the q-axis current command value iqa* are respectively constant values ω and −ω (where ω is a positive constant number), and in a high-speed rotation region where the absolute value of the rotational angular velocity of the motor exceeds the first threshold ω1, the upper limit of the q-axis current command value iqa* decreases linearly with the increase of the rotational angular velocity ω of the motor, and the lower limit of the q-axis current command value iqa* increases linearly (absolute value is decreased) with the increase of the absolute value of the rotational angular velocity ω of the motor. That is, there is obtained the characteristic that while the absolute values of the upper limit and the lower limit of the q-axis current command value iqa* are kept at the constant values in the low-and-middle-speed rotation region where the absolute value is smaller than or equal to the first predetermined threshold ω1, the absolute values of the upper limit and the lower limit of the q-axis current command value iqa* decrease linearly in accordance with the increase of the absolute value of the rotational angular velocity ω of the motor in the high-speed rotation region where the absolute value exceeds the first threshold ω1.

On the other hand, when the magnetic-flux weakening control is carried out, the q-axis current command value $i_{qa}^*$ is limited in accordance with characteristics L2+ and L2− denoted by solid lines. The characteristic L2+ represents an upper limit of setting a positive q-axis current command value $i_{qa}^*$ in order to generate torque in one direction (for example, clockwise direction), and the characteristic L2− represents a lower limit of setting a negative q-axis current command value $i_{qa}^*$ in order to generate torque in the other direction (for example, counterclockwise direction). In this case, in a rotational angular velocity region where the absolute value of the rotational angular velocity ω of the motor is smaller than or equal to a second threshold ω2 (the second threshold ω2 is greater than ω1, for example ω2=900 rpm), the upper limit and lower limit of the q-axis current command value $i_{qa}^*$ are respectively constant values α and −α (where α is a positive constant number). Also, in a rotational angular velocity region where the absolute value of the rotational angular velocity ω of the motor exceeds the second threshold ω2, there is obtained the characteristic that the upper limit of the q-axis current command value $i_{qa}^*$ decreases nonlinearly with the increase of the rotational angular velocity ω of the motor, and the lower limit of the q-axis current command value $i_{qa}^*$ increases nonlinearly (absolute value is decreased) with the increase of the absolute value of the rotational angular velocity ω of the motor. That is, there is obtained the characteristic that while the absolute values of the upper limit and lower limit of the q-axis current command value $i_{qa}^*$ are kept at constant values in the rotational angular velocity region where the absolute value is equal to or smaller than the second threshold ω2, the absolute values of the upper limit and lower limit of the q-axis current command value $i_{qa}^*$ decrease nonlinearly according to the increase of the absolute value of the rotational angular velocity ω of the motor in the rotational angular velocity region where the absolute value exceeds the second threshold ω2.

The q-axis current corresponds to the output torque of the electric motor 3. Accordingly, when the magnetic-flux weakening control is not carried out, as can be understood from the characteristics L1+ and L1−, the output torque decreases according to a rise in the absolute value of the rotational angular velocity ω of the motor in the high-speed region where the absolute value of the rotational angular velocity ω of the motor exceeds the first threshold ω1, and any torque will not be generated in a certain rotational speed ω10 (for example, ω10=1500 rpm). Thus, by setting the d-axis current command value $i_{da}^*$ to a significant value other than zero to carry out the magnetic-flux weakening control in the high-speed rotation region where the absolute value exceeds the first threshold ω1, the output of the electric motor 3 can be increased in the high-speed rotation region where the absolute value exceeds the first threshold ω1.

The upper limit $i_{qa\_uplim}$ of the q-axis current command value $i_{qa}^*$ when the magnetic-flux weakening control is carried out is given in the following Expression (3), and its lower limit $i_{qa\_downlim}$ is given in the following Expression (4). Here, the upper limit $i_{qa\_uplim}$ is applied to the positive q-axis current command value $i_{qa}^*$ and the lower limit $i_{qa\_downlim}$ is applied to the negative q-axis current command value $i_{qa}^*$.

$$i_{qa\_up\ lim} \begin{cases} \alpha & \text{if } \omega \leq \omega 2 \\ \dfrac{-E + \sqrt{E^2 - DF}}{D} & \text{if } \omega > \omega 2 \end{cases} \quad (3)$$

$$i_{qa\_down\ lim} \begin{cases} -\alpha & \text{if } \omega \geq \omega 2 \\ \dfrac{-E + \sqrt{E^2 - DF}}{D} & \text{if } \omega < -\omega 2 \end{cases} \quad (4)$$

Here, in above Expression, $$D = R^2(L_d - L_q)^2 \omega^2 - (R^2 + L_d^2 \omega^2)(R^2 + L_q^2 \omega^2)$$

$$E = R(L_d - L_q)L_d \phi \omega^3 - (R^2 + L_d^2 \omega^2)R\phi\omega$$

$$F = -R^2 \phi^2 \omega^2 + (R^2 + L_d^2 \omega^2)V_{lim}^2$$

R is the stator winding resistance of the motor,
φ is the magnetic flux on dq coordinates calculated from the interlinking magnetic flux of a stator caused by a field,
ω is the rotational angular velocity at an electric angle of the motor,
$L_d$ is d-axis inductance,
$L_q$ is q-axis inductance,
$V_{lim}$ is a limit voltage in the dq coordinates where the sinusoidal control is allowed (a limit voltage in the dq coordinates when the influence of the dead time control is not taken into consideration),
α is a positive constant number.

Further, the d-axis current command value $i_{da}^*$ for the magnetic-flux weakening control is given in the following Expression (5).

$$i_{da}^* = \frac{-B + \sqrt{B^2 - AC}}{A} \quad (5)$$

Here, in the above expression, $$A = R^2 + L_d^2 \omega^2$$

$$B = R(L_d - L_q)\omega i_{qa}^* + L_d \phi \omega^2$$

$$C = (R^2 + L_q^2 \omega^2) i_{qa}^{*2} + 2R\phi \omega i_{qa}^* + \phi^2 \omega^2 - V_{lim}^2$$

Figure 3:
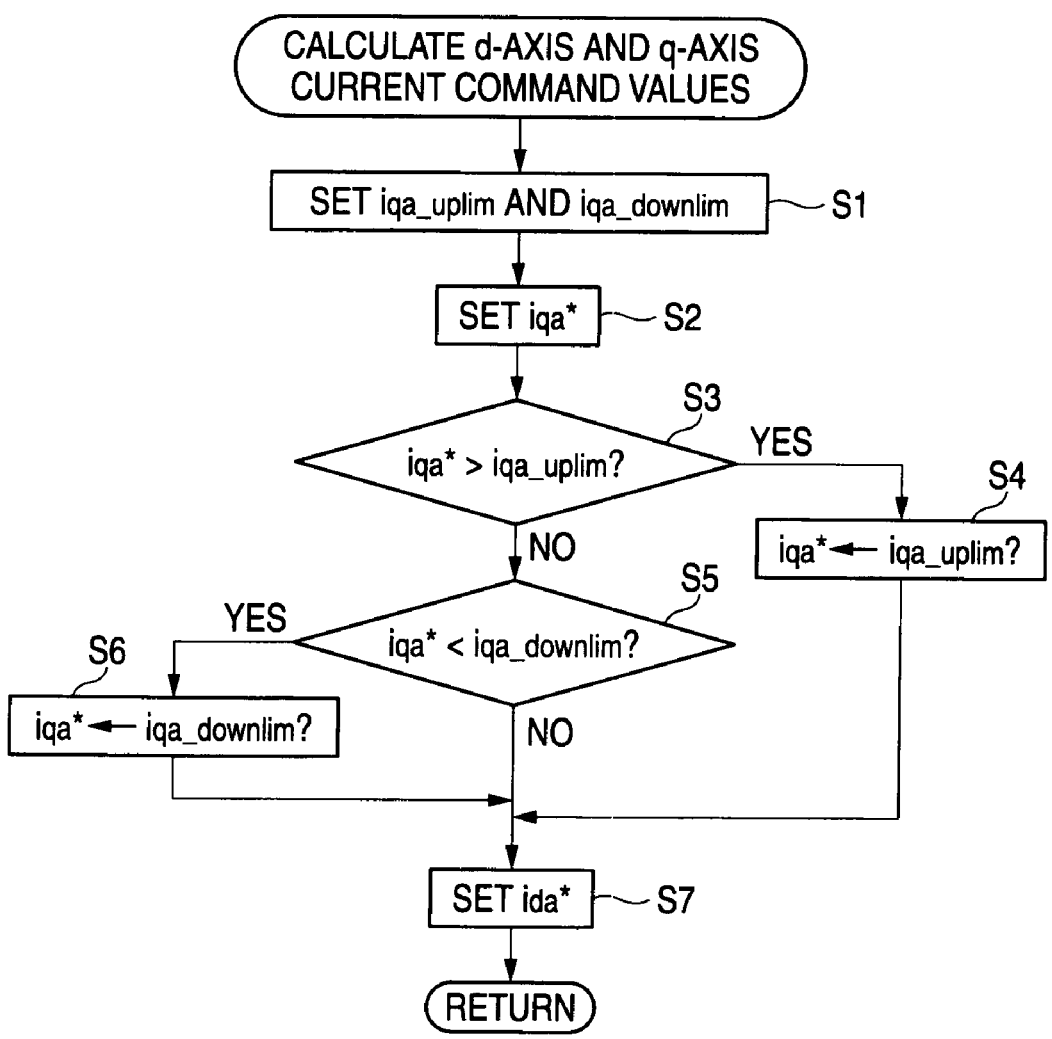
FIG. 3 is a flowchart illustrating the operation of the dq-axis current command value calculating unit when a magnetic-flux weakening control is carried out.

FIG. 3 is a flowchart illustrating the operation of the dq-axis current command value calculating unit 26 when the magnetic-flux weakening control is carried out. The dq-axis current command value calculating unit 26 sets the upper limit $i_{qa\_uplim}$ and lower limit $i_{qa\_downlim}$ corresponding to the rotational angular velocity $\omega$ of the motor, according to the characteristics L2$^+$ and L2$^-$ of FIG. 2 (Step S1). Moreover, the dq-axis current command value calculating unit 26 set the q-axis current command value $i_{qa}^*$ on the basis of vehicle speed and steering speed (Step S2).

Next, the dq-axis current command value calculating unit 26 compares the q-axis current command value $i_{qa}^*$ and the upper limit $i_{qa\_uplim}$ (Step S3). If the q-axis current command value $i_{qa}^*$ is greater than the upper limit $i_{qa\_uplim}$ (Step S3: YES), this q-axis current command value $i_{qa}^*$ is limited. That is, the upper limit $i_{qa\_uplim}$ is substituted as the q-axis current command value $i_{qa}^*$ used for the subsequent control (Step S4).

On the other hand, if the q-axis current command value $i_{qa}^*$ is smaller than or equal to the upper limit $i_{qa\_uplim}$ (Step S3: NO), then the dq-axis current command value calculating unit 26 compares the q-axis current command value $i_{qa}^*$ and the lower limit $i_{qa}^*$ downlim (Step S5). If the q-axis current command value $i_{qa}^*$ is less than the upper limit $i_{qa\_downlim}$ (Step S5. YES), this q-axis current command value $i_{qa}^*$ is limited. That is, the lower limit $i_{qa\_downlim}$ is substituted as the q-axis current command value $i_{qa}^*$ used for the subsequent control (Step S6).

If the q-axis current command value $i_{qa}^*$ set in Step S2 is a value which is smaller than or equal to the upper limit $i_{qa\_uplim}$ (Step S3: NO) and is greater than or equal to the lower limit $i_{qa\_downlim}$ (Step S5: NO), the q-axis current command value $i_{qa}^*$ is used as it is.

In this way, after a limit according to need is applied to the q-axis current command value $i_{qa}^*$, the dq-axis current command value calculating unit 26 sets the d-axis current command value $i_{da}^*$ according to the Expression (5).

Current deviations are obtained in the subtraction units 27d and 27q on the basis of the q-axis current command value $i_{qa}^*$ and the d-axis current command value $i_{da}^*$. Further, the PI control by the current PI control units 29d and 29q is carried out on the basis of these current deviations. Thereby, the d-axis voltage command value $V_{da}^*$ and the q-axis voltage command value $V_{qa}^*$ are obtained, and are given to the dq/three-phase AC coordinate conversion unit 31.

Figure 4:
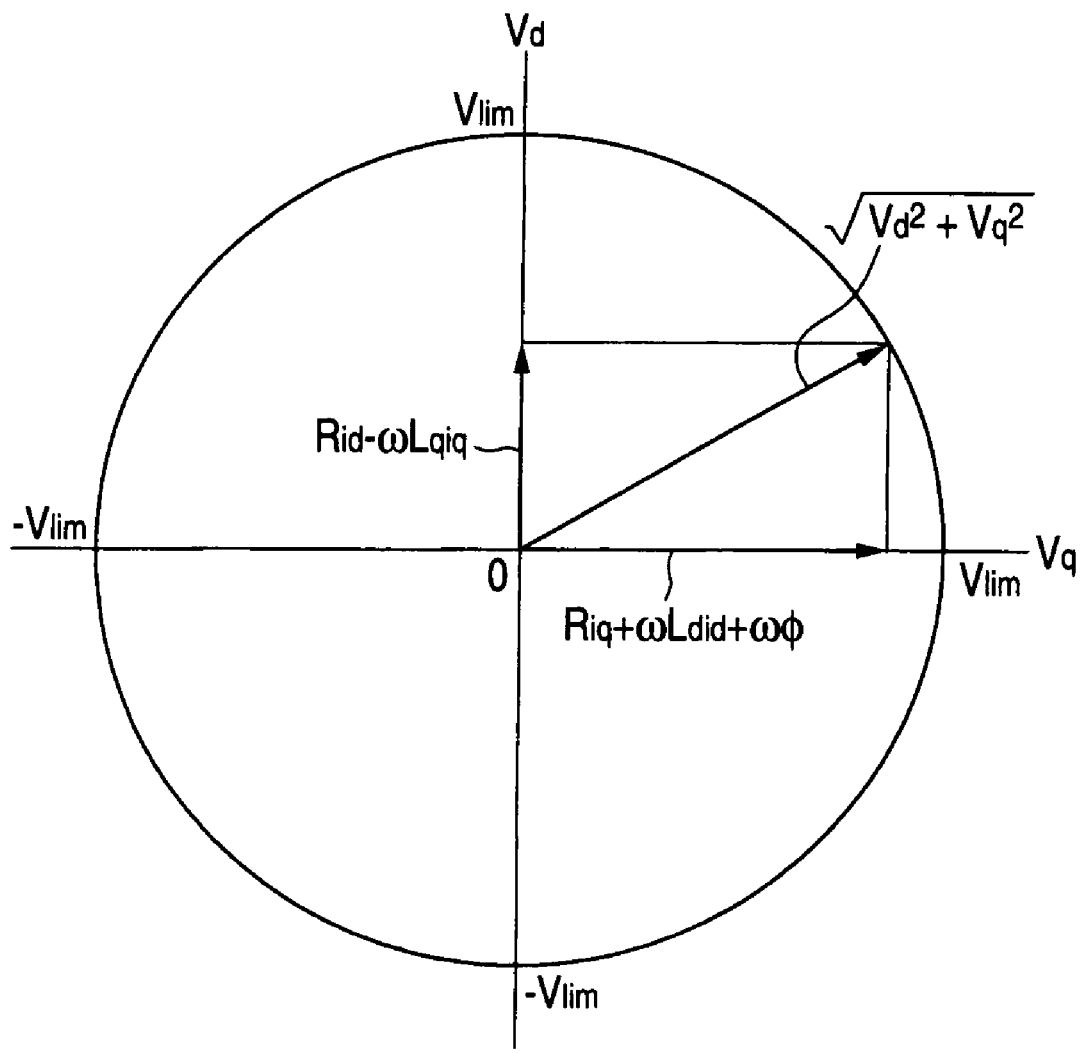
FIG. 4 is a view illustrating conditions imposed on a d-axis voltage command value $V_{da}^*$ and a q-axis voltage command value $V_{qa}^*$ for the sinusoidal driving.

FIG. 4 is a view illustrating conditions imposed on a d-axis voltage command value $V_{da}^*$ and a q-axis voltage command value $V_{qa}^*$ for the sinusoidal driving. In order to set the voltage of each phase of the electric motor 3 to sine waves, it is necessary to set the amplitude of each phase voltage to ½ and less of the power source voltage $E_d$ (battery voltage), and it is necessary to satisfy the following Expression (6) concerning the d-axis voltage $V_d$ and the q-axis voltage $V_q$ (WO2006/109809).

$$\sqrt{(V_d^2 + V_q^2)} \le E_d \sqrt{3}/2\sqrt{2} = V_{lim} \tag{6}$$

On the other hand, the q-axis voltage $V_q$ and the d-axis voltage $V_d$ in a normal state are expressed as follows.

$$V_d = R i_{da}^* - \omega L_q i_{qa}^* \tag{7}$$

$$V_q = R i_{qa}^* + \omega L_d i_{da}^* + \omega \phi \tag{8}$$

If these are substituted into the above Expression (6), the following Expression (9) is obtained.

$$\sqrt{(R i_{qa}^* + \omega L_d i_{da}^* + \omega \phi)^2 + (R i_{da}^* - \omega L_q i_{qa}^*)^2} \le V_{lim} \tag{9}$$

When the magnetic-flux weakening control is not carried out, that is, when d-axis current command value $i_{da}^* = 0$ is given, the condition in which the above Expression (9) is satisfied is the following Expression (10).

$$\sqrt{(R i_{qa}^* + \omega \phi)^2 + (-\omega L_q i_{qa}^*)^2} \le V_{lim} \tag{10}$$

If this is modified, it can be understood that the condition for carrying out the sinusoidal driving when the magnetic-flux weakening control is not carried out is given in the following Expression (11).

$$(R^2 + L_q^2 \omega^2) i_{qa}^{*2} + 2R\phi \omega i_{qa}^* + \phi^2 \omega^2 - V_{lim}^2 \le 0 \tag{11}$$

On the other hand, when the above Expression (10) is not satisfied in $i_{da}^* = 0$, that is, when the condition of the following Expression (12) is given, it is necessary to satisfy the above Expression (9) by setting d-axis current command value $i_{da}^* \ne 0$.

$$(R^2 + L_q^2 \omega^2) i_{qa}^{*2} + 2R\phi \omega i_{qa}^* + \phi^2 \omega^2 - V_{max}^2 > 0 \tag{12}$$

Thus, if the above Expression (9) is solved concerning $i_{da}^*$, the following Expression (13) is obtained.

$$\frac{-B - \sqrt{B^2 - AC}}{A} \le i_{da}^* \le \frac{-B + \sqrt{B^2 - AC}}{A} \tag{13}$$

Here, in the above expression, $$A = R^2 + L_d^2 \omega^2,$$

$$B = R(L_d - L_q)\omega i_{qa}^* + L_d \phi \omega^2, \text{ and}$$

$$C = (R^2 + L_q^2 \omega^2) i_{qa}^{*2} + 2R\phi \omega i_{qa}^* + \phi^2 \omega^2 - V_{lim}^2$$

Since the motor efficiency is decreased as the absolute value of the d-axis current becomes larger, it is desirable that a minimum value of the absolute value which satisfies the condition of the above Expression (13) is set to the d-axis current command value $i_{da}^*$.

Since A>0 is apparent, and C>0 is satisfied from the above Expression (12), the following Expression (14) and Expression (15) are obtained.

$$\text{If } B > 0, \; i_{da}^* = \frac{-B + \sqrt{B^2 - AC}}{A} \tag{14}$$

$$\text{If } B < 0, \; i_{da}^* = \frac{-B - \sqrt{B^2 - AC}}{A} \tag{15}$$

In the above Expression (15), the d-axis current command value $i_{da}^*$ becomes a positive value, and a current flows in the direction in which the field of the d-axis is strengthened. Thus, if B<0, $i_{da} = 0$ is satisfied.

Here, if $B^2 - AC \ge 0$ is not satisfied, the value of the above Expression (14) becomes an imaginary number, $i_{da}^*$ which satisfies the above Expression (14) does not exist. That is, even if any d-axis current command value $i_{da}*$ is set, it is not converged into the range of the limit voltage indicated by a circle of FIG. 4. Thus, if $B^2-AC \geqq 0$ is solved concerning $i_{da}*$, and the following Expression (16) is obtained. This becomes a condition imposed on the q-axis current command value $i_{qa}*$ in order to converge the voltages into the range of the limit voltage, that is, it is the condition for carrying out the sinusoidal driving.

$$\frac{-E+\sqrt{E^2-DF}}{D} \leq i_{qa}^* \leq \frac{-E-\sqrt{E^2-DF}}{D} \quad (16)$$

Here, in the above expression, $D=R^2(L_d-L_q)^2\omega^2-(R^2+L_d^2\omega^2)(R^2+L_q^2\omega^2)$.

$E=R(L_d-L_q)L_d\phi\omega^3-(R^2+L_d^2\omega^2)R\phi\omega$, and $F=-R^2\phi^2\omega^2+(R^2+L_d^2\omega^2)V_{lim}^2$.

Accordingly, the q-axis current command value $i_{qa}*$ is limited to the range of the above Expression (16) in advance (Steps S3 to S6 of FIG. 3), and thereafter, the d-axis current command value $i_{da}*$ may be obtained according to the above Expression (15) (Step S7 of FIG. 3). Thereby, a maximum output can be obtained within the range of the limit voltage. That is, it is possible to attain an increase in output without producing vibration even in the high-speed rotation region. Thereby, a steering feeling of the electric power steering apparatus can be improved.

Further, since the q-axis current command value $i_{qa}*$ is limited in advance and the d-axis current command value $i_{da}*$ corresponding to the q-axis current command value $i_{qa}*$ is set, unlike WO2006/109809 which applies a limit to the q-axis voltage command value afterwards, the q-axis current does not become variable.

Figure 5:
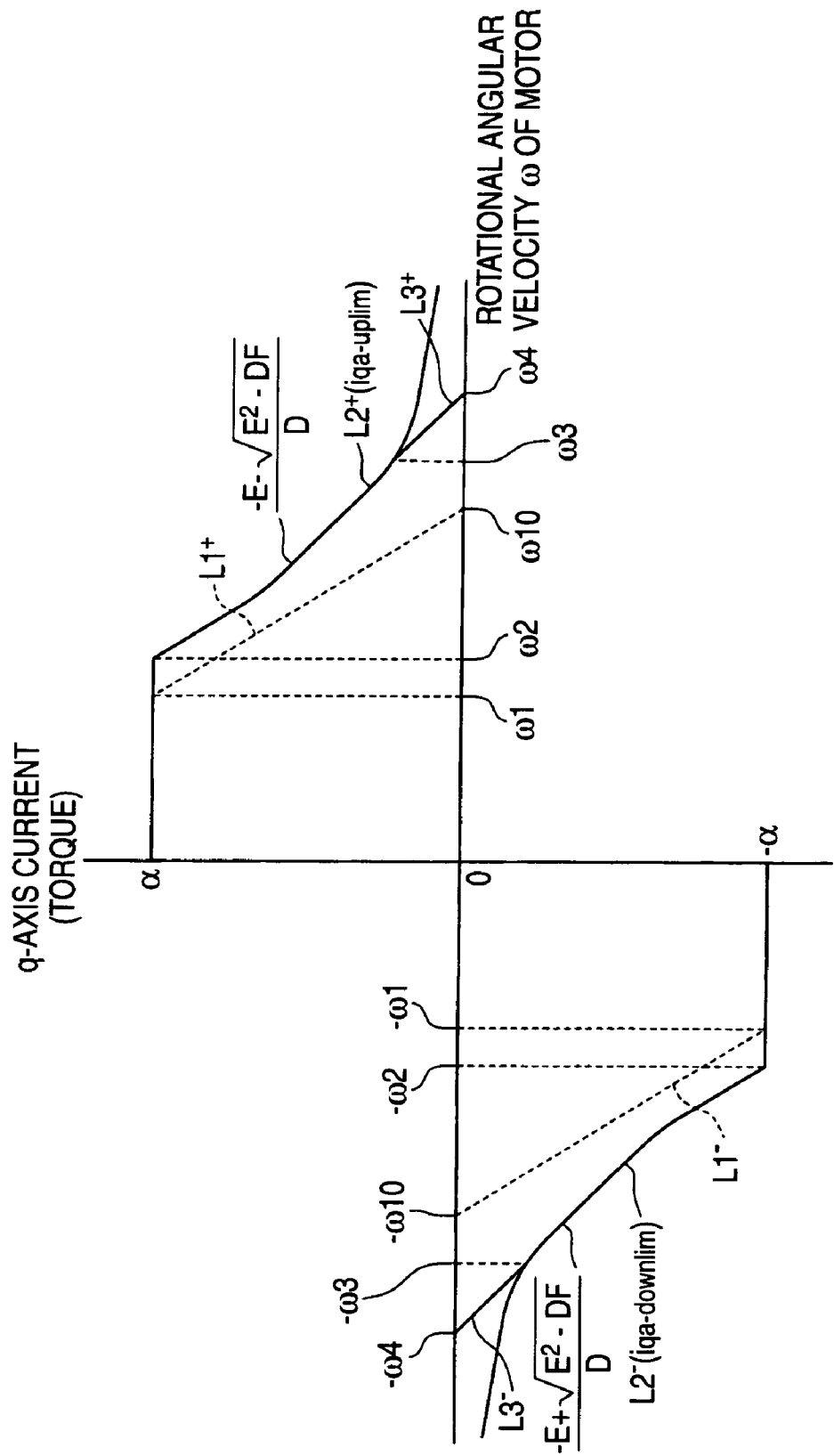
FIG. 5 is a view illustrating a second embodiment of the invention, and showing the upper limit $i_{qa\_uplim}$ and the lower limit $i_{qa\_downlim}$ of the q-axis current command value $i_{qa}^*$ set by the dq-axis current command value calculating unit.

FIG. 5 is a view illustrating a second embodiment of the invention, and showing the upper limit $i_{qa\_uplim}$ and the lower limit $i_{qa\_downlim}$ of the q-axis current command value $i_{qa}*$ set by the dq-axis current command value calculating unit 26 in the configuration of FIG. 1.

In the second embodiment, in a rotational speed region where the absolute value of the rotational angular velocity ω of the motor exceeds a third predetermined threshold ω3 which is greater than the second predetermined threshold ω2, for example the third predetermined threshold ω3=3500 rpm, characteristics L3+ and L3− which put limits larger than the limits by the above Expression (16), on the q-axis current command value $i_{qa}*$ are applied. That is, in a range where the absolute value |ω| of the rotational angular velocity of the motor exceeds the third threshold ω3, the absolute values of the upper limit $i_{qa\_uplim}$ and the lower limit $i_{qa\_downlim}$ decrease linearly at a change rate larger than that of the above Expression (16), with an increase in the absolute value |ω| of the rotational angular velocity of the motor such that the absolute values of the upper limit $i_{qa\_uplim}$ and the lower limit $i_{qa\_downlim}$ are set to be smaller than that of the above Expression (16). Then, the upper limit $i_{qa\_uplim}$ and the lower limit $i_{qa\_downlim}$ becomes zeros, respectively, in fourth thresholds ω4 and −ω4 which are greater than ω3, for example the fourth threshold ω4=4000 rpm.

By adopting such a configuration, the rotational angular velocity ω of the motor can be prevented from becoming a large value abnormally. Thus, the variable of software to be executed by the microcomputer 6 does not overflow, but stable control becomes possible.

Figure 6:
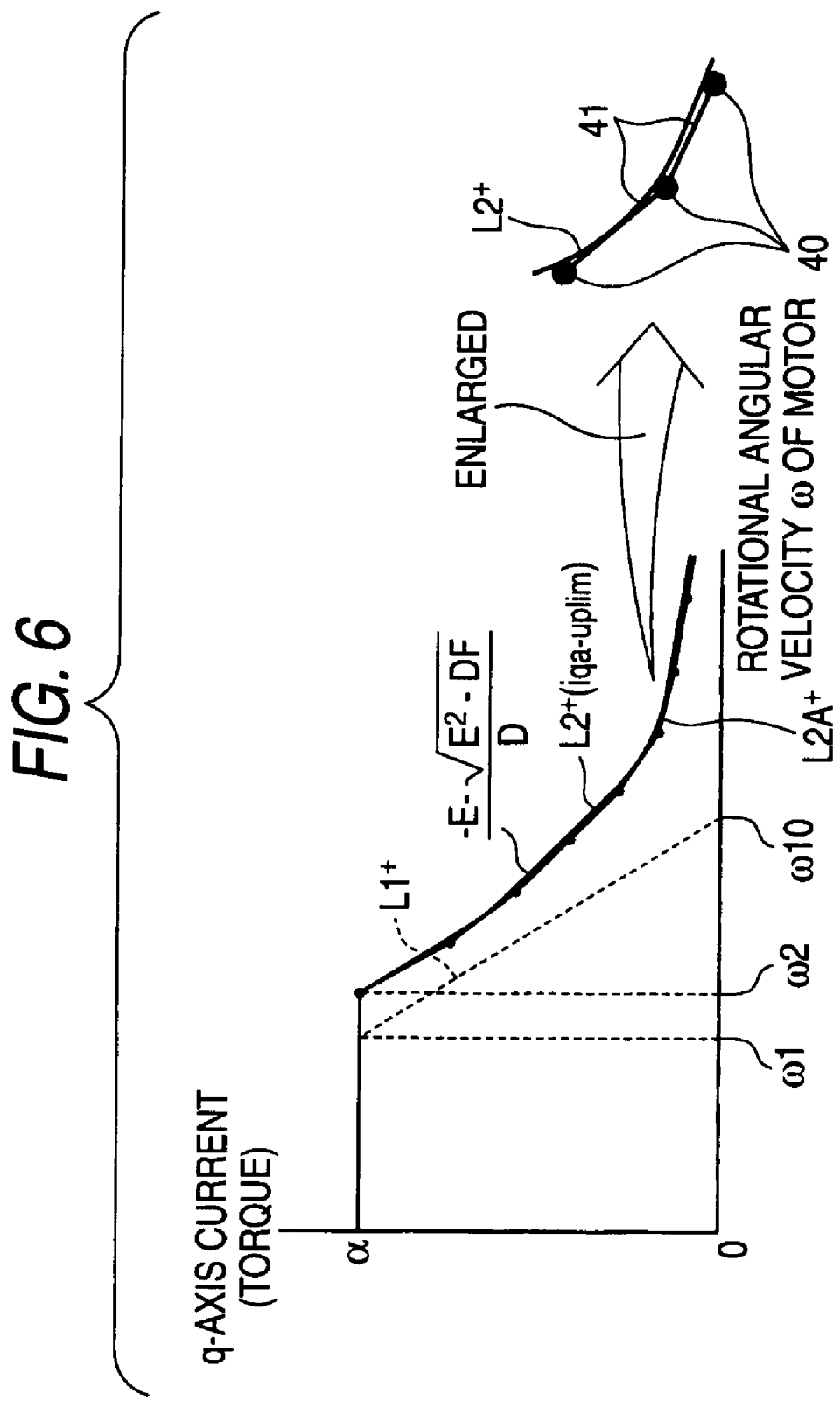
FIG. 6 is a view illustrating a third embodiment of the invention, and showing the upper limit $i_{qa\_uplim}$ and the lower limit $i_{qa\_downlim}$ of the q-axis current command value $i_{qa}^*$ set by the dq-axis current command value calculating unit.

FIG. 6 is a view illustrating the third embodiment of the invention, and showing the upper limit $i_{qa\_uplim}$ and the lower limit $i_{qa\_downlim}$ of the q-axis current command value $i_{qa}*$ set by the dq-axis current command value calculating unit 26 in the configuration of FIG. 1.

In this embodiment, according to a polygonal line characteristic L2A+ constituted by a segment which is inscribed with a curve of the characteristic L2+ of FIG. 2 (a segment touching the curve from the origin O), the upper limit $i_{qa\_uplim}$ of the q-axis current command value $i_{qa}*$ is determined. Although it is not shown, according to a polygonal line characteristic L2A− constituted by a segment which is inscribed with a curve of the characteristic L2− of (a segment touching the curve from the origin O), the lower limit $i_{qa\_downlim}$ of the q-axis current command value $i_{qa}*$ is determined similarly. More specifically, the values of a plurality of apexes 40 which form the polygonal line characteristics L2A+ and L2A− are stored in a memory (not shown) included in the microcomputer 6, and the values on segments 41 between the apexes 40 are obtained by linear interpolation. By adopting such a configuration, a calculation load for limiting the q-axis current command value $i_{qa}*$ into the limit range of the above Expression (16) can be reduced.

Figure 7:
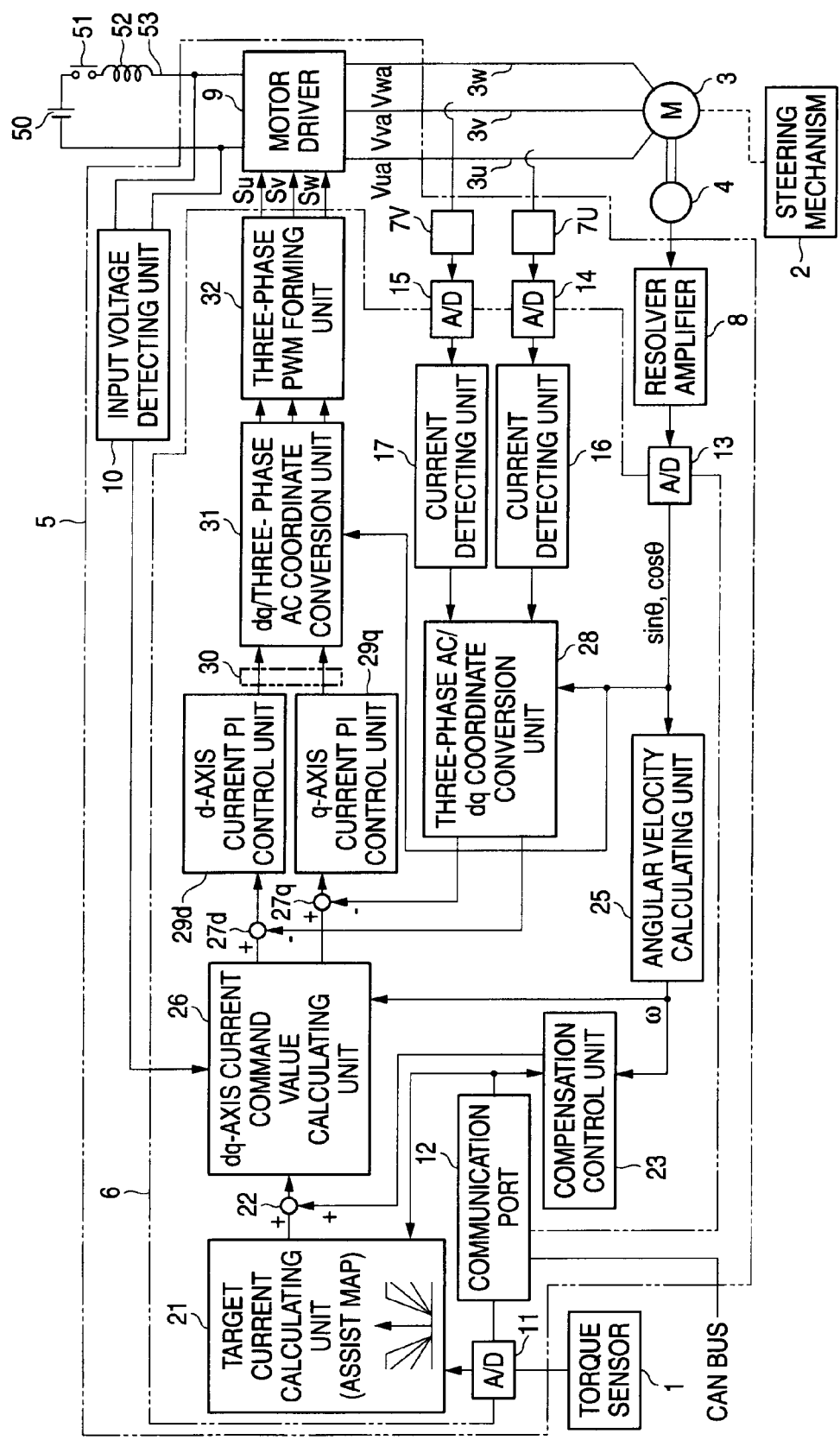
FIG. 7 is a block diagram illustrating the electrical configuration of an electric power steering apparatus according to a fourth embodiment of the invention.

FIG. 7 is a block diagram illustrating the electrical configuration of an electric power steering apparatus according to the fourth embodiment of the invention. In addition to the configuration of FIG. 1, the motor control device 5 shown in FIG. 7 further includes an input voltage detecting unit 10 which detects an input voltage input to the motor driver 9.

Electric power is supplied to the motor driver 9 from a battery 50 (vehicle-mounted battery). A relay 51 and a coil 52 are interposed in series in a feed line 53 for supplying the electric power. The relay 51 functions as a fail-safe relay which is broken by control of the microcomputer 6 when abnormality occurs in the motor control device 5 in addition to being turned on/off in an interlocking manner with an ignition key switch. The coil 52 is provided to reduce noises.

The input voltage detecting unit 10 detects an input voltage $V_b$ which is developed in the feed line 53 between the coil 52 and the motor driver 9. A signal representing this detection result is input to the microcomputer 6. In this configuration, since the input voltage $V_b$ to the motor driver 9 can be detected, eliminating the influence of a voltage drop in the relay 51 or coil 52. Thus, a maximum voltage which can be applied to the electric motor 3 can be properly set in accordance with the input voltage $V_b$.

Figure 8:
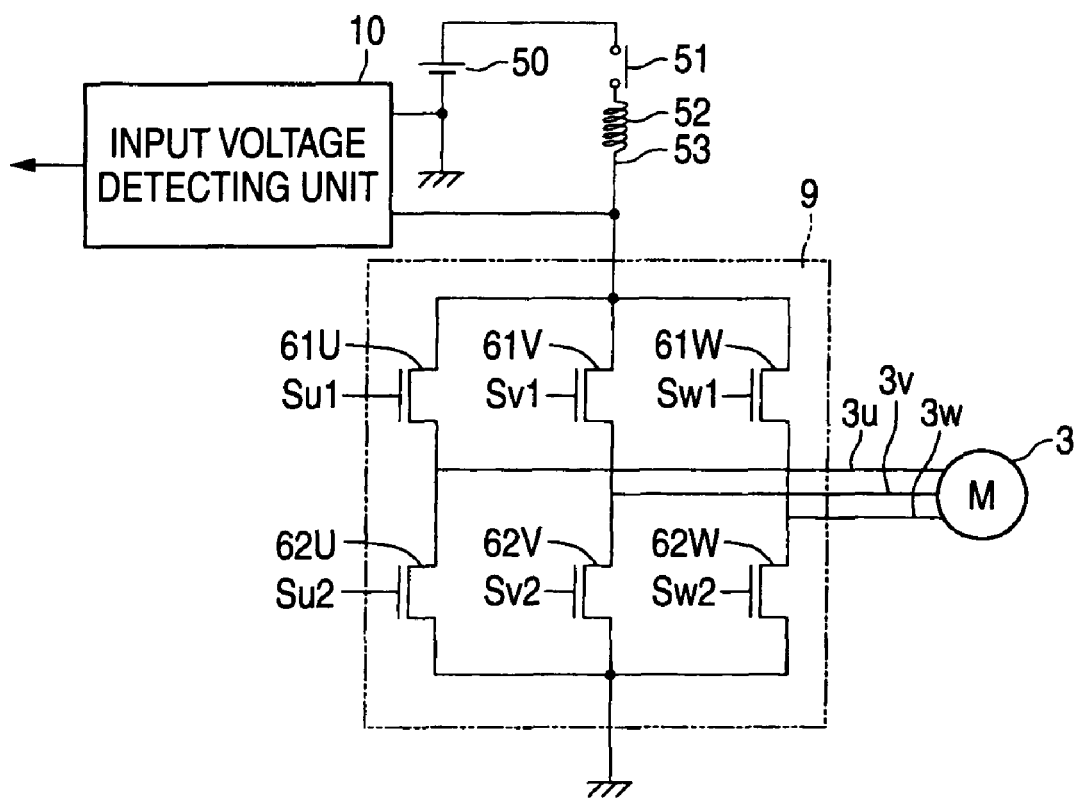
FIG. 8 is an electrical circuit diagram illustrating an exemplary configuration of a motor driver according to the fourth embodiment of the invention.

FIG. 8 is an electrical circuit diagram illustrating an exemplary configuration of the motor driver 9 shown in FIG. 7. The motor driver 9 is configured as an inverter circuit, and includes three switching elements corresponding to the U-phase, V-phase, and W-phase of the electric motor 3. That is, a series circuit composed of a pair of U-phase upper switching element 61U and U-phase lower switching element 62U is provided in correspondence with the U-phase. Further, a series circuit composed of a pair of V-phase upper switching element 61V and V-phase lower switching element 62V is provided in correspondence with the V-phase. Moreover, a series circuit composed of a pair of W-phase upper switching element 61W and W-phase lower switching element 62W is provided in correspondence with the W-phase. Also, these three series circuits are connected in parallel to the battery 50. The switching elements 61U, 62U; 61V, 62V; and 61W, 62W are constituted by power transistors (for example, power MOSFET).

A U-phase armature winding $3u$ of the electric motor 3 is connected between the U-phase upper switching element 61U and the U-phase lower switching element 62U. Further, a V-phase armature winding 3v of the electric motor 3 is connected between the V-phase upper switching element 61V and the V-phase lower switching element 62V. Similarly, a W-phase armature winding 3w of the electric motor 3 is connected between the W-phase upper switching element 61W and the W-phase lower switching element 62W.

The PWM signal $S_u$ formed by the three-phase PWM forming unit 32 for the U-phase includes an upper control signal (PWM control signal) $S_{u1}$ for turning on/off the U-phase upper switching element 61U and a lower control signal (ON/OFF control signal) $S_{u2}$ for turning on/off the U-phase lower switching element 62U. Further, the PWM signal $S_v$ formed by the three-phase PWM forming unit 32 for the V-phase includes an upper control signal (PWM control signal) $S_{v1}$ for turning on/off the V-phase upper switching element 61V and a lower control signal (ON/OFF control signal) $S_{v2}$ for turning on/off the V-phase lower switching element 62V. Moreover, the PWM signal $S_w$ formed by the three-phase PWM forming unit 32 for the W-phase includes an upper control signal (PWM control signal) $S_{w1}$ for turning on/off the W-phase upper switching element 61W and a lower control signal (ON/OFF control signal) $S_{w2}$ for turning on/off the W-phase lower switching element 62W.

By the above configuration, a commutation control is carried out. That is, while the upper switching elements 61U, 61V, and 61W are cyclically PWM-controlled with their timings shifted by the upper control signals $S_{u1}$, $S_{v1}$, and $S_{w1}$, the lower switching elements 62U, 62V, and 62W are cyclically turned on with their timings shifted by the lower control signals $S_{u2}$, $S_{v2}$, and $S_{w2}$. Of course, the period during which the upper switching element of each phase is PWM-controlled deviates in timing from the period during which the lower switching element is turned on. Also, in order for the upper switching element and lower switching element of each phase not to be short-circuited due to being simultaneously turned on, the dead time during which both the upper switching element and the lower switching element are turned off is set between the PWM control period of the upper switching element and the ON period of the lower switching element. That is, the three-phase PWM forming unit 32 executes the dead time control of forming the PWM signals $S_u$, $S_v$, and $S_w$ so that such dead time is set.

Since the operation of the dq-axis current command value calculating unit 26 shown in FIG. 7 is substantially similar to that of the dq-axis current command value calculating unit 26 shown in FIG. 1, an explanation regarding the operation is omitted. However, the upper limit $i_{qa\_uplim}$ of the q-axis current command value iqa* when the magnetic-flux weakening control is carried out according to the fourth embodiment is different from that of the q-axis current command value iqa* when the magnetic-flux weakening control is carried out according to the first embodiment, and which is given in the following Expression (17), and its lower limit $i_{qa\_downlim}$ is given in the following Expression (18). Here, the upper limit $i_{qa\_uplim}$ is applied to the positive q-axis current command value $i_{qa}$* and the lower limit $i_{qa\_downlim}$ is applied to the negative q-axis current command value $i_{qa}$*.

$$i_{qa\_uplim} \begin{cases} \alpha & \text{if } \omega \leq \omega 2 \\ \dfrac{-E + \sqrt{E^2 - DF}}{D} & \text{if } \omega > \omega 2 \end{cases} \quad (17)$$

$$i_{qa\_downlim} \begin{cases} -\alpha & \text{if } \omega \geq -\omega 2 \\ \dfrac{-E + \sqrt{E^2 - DF}}{D} & \text{if } \omega < -\omega 2 \end{cases} \quad (18)$$

Here, in above Expression, $$D = R^2(L_d - L_q)^2 \omega^2 - (R^2 + L_d^2 \omega^2)(R^2 + L_q^2 \omega^2)$$

$$E = R(L_d - L_q)L_d \varphi \omega^3 - (R^2 + L_d^2 \omega^2) R \varphi \omega$$

$$F = -R^2 \varphi^2 \omega^2 + (R^2 + L_d^2 \omega^2) V_{max}^2$$

$$V_{max} = V_{lim} - \frac{2\sqrt{6}}{3} |V_{DT}|$$

$$|V_{DT}| \cong V_b \times t_d \times f_c$$

R is the stator winding resistance of the motor,
φ is the magnetic flux on dq coordinates calculated from the interlinking magnetic flux of a stator caused by a field,
ω is the rotational angular velocity at an electric angle of the motor,
$L_d$ is d-axis inductance,
$L_q$ is q-axis inductance,
$V_{max}$ is a limit voltage in the dq coordinates when the influence of the dead time control is taken into consideration,
$V_{min}$ is a limit voltage in the dq coordinates where the sinusoidal control is allowed (a limit voltage in the dq coordinates when the influence of the dead time control is not taken into consideration),
$V_{DT}$ is a voltage fluctuation generated in each phase by the dead time control,
$V_b$ is the input voltage to the motor driver,
$t_d$ is dead time,
$f_c$ is PWM frequency, and
α is a positive constant number.

Further, the d-axis current command value $i_{da}$* for the magnetic-flux weakening control is given in the following Expression (19).

$$i_{da}^* = \frac{-B + \sqrt{B^2 - AC}}{A} \quad (5)$$

Here, in the above expression, $$A = R^2 + L_d^2 \omega^2$$

$$B = R(L_d - L_q) \omega i_{qa}^* + L_d \phi \omega^2$$

$$C = (R^2 + L_q^2 \omega^2) i_{qa}^{*2} + 2R\phi \omega i_{qa}^* + \phi^2 \omega^2 - V_{max}^2$$

Figure 9:
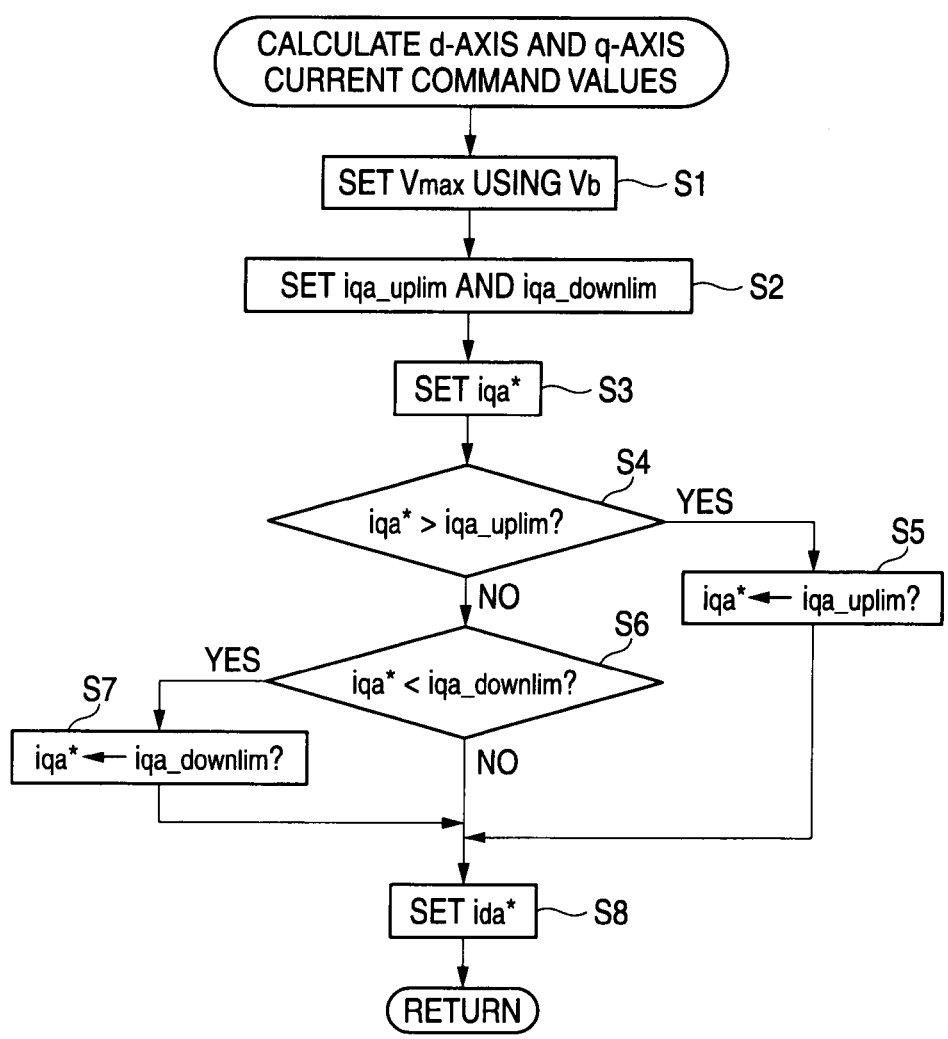
FIG. 9 is a flowchart illustrating the operation of the dq-axis current command value calculating unit when magnetic-flux weakening control is carried out.

FIG. 9 is a flowchart illustrating the operation of the dq-axis current command value calculating unit 26 shown in FIG. 7 when the magnetic-flux weakening control is carried out according to the fourth embodiment. The dq-axis current command value calculating unit 26 obtains a limit voltage $V_{max}$ on the basis of the input voltage $V_b$ detected by the input voltage detecting unit (Step S1). Then, the dq-axis current command value calculating unit 26 sets the upper limit $i_{qa\_uplim}$ and lower limit $i_{qa\_downlim}$ corresponding to the rotational angular velocity ω of the motor, according to the characteristics L2$^+$ and L2$^-$ (Step S2). These upper limit $i_{qa\_uplim}$ and lower limit $i_{qa\_downlim}$ is set on the basis of the limit voltage $V_{max}$, as can be understood from the above Expressions (17) and (18).

The processes of Steps S3 to S8 of FIG. 9 is substantially same as that of Steps S2 to S7 of FIG. 3. Therefore, the explanation of the processes of Steps S3 to S8 of FIG. 9 are omitted.

Figure 10:
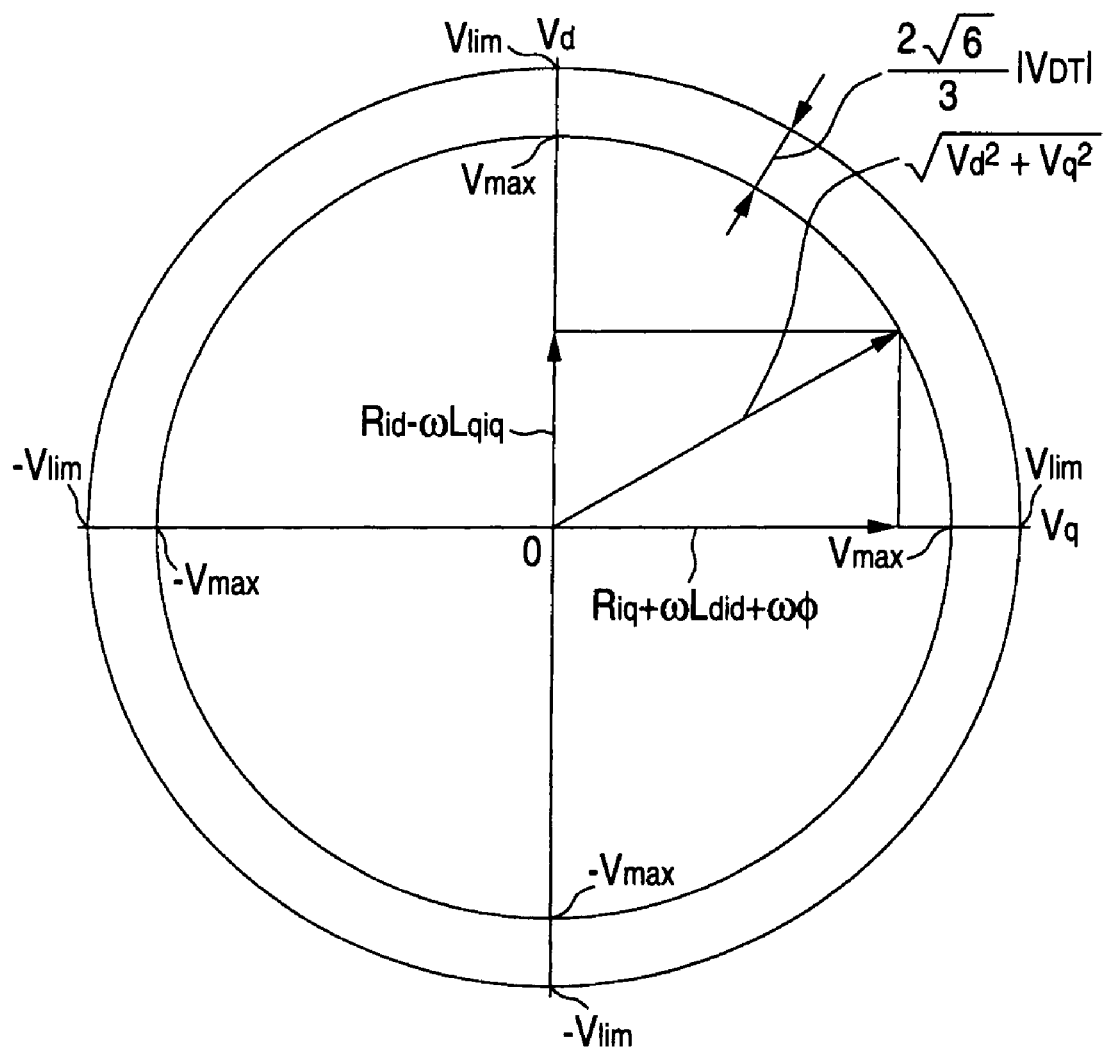
FIG. 10 is a view illustrating conditions imposed on a d-axis voltage command value $V_{da}^*$ and a q-axis voltage command value $V_{qa}^*$ for the sinusoidal driving.

FIG. 10 is a view illustrating conditions imposed on a d-axis voltage command value $V_{da}{}^*$ and a q-axis voltage command value $V_{qa}{}^*$ for the sinusoidal driving according to the fourth embodiment. In order to set the voltage of each phase of the electric motor 3 to sine waves, it is necessary to set the amplitude of each phase voltage to ½ and less of the input voltage $V_b$, and it is necessary to satisfy the following Expression (20) concerning the d-axis voltage $V_d$ and the q-axis voltage $V_q$ (WO2006/109809).

$$\sqrt{(V_d^2+V_q^2)} \leq V_b\sqrt{3}/2\sqrt{2}=V_{lim} \tag{20}$$

On the other hand, a voltage fluctuation occurs in each phase by the aforementioned dead time control. The fact that there is a fear that the d-axis voltage $V_d$ and the q-axis voltage $V_q$ becomes a value out of a range where the sinusoidal driving is allowed, on account of the voltage fluctuation is as mentioned above. Thus, in this embodiment, in consideration of the influence of the dead time control, the limit voltage set on dq coordinates in order to carry out the sinusoidal driving is set to the limit voltage $V_{max}$ given in the following Expression (20A).

$$\sqrt{(V_d^2+V_q^2)} \leq V_{max} = V_{lim} - \frac{2\sqrt{6}}{3}|V_{DT}| \tag{20A}$$

Here, $|V_{DT}| \cong V_b \times t_d \times f_c$ $V_{DT}$ is a voltage fluctuation generated in each phase by the dead time control, $V_b$ is an input voltage to the motor driver 9, and $t_d$ is dead time.

The above Expression (20A) is derived in the following way.

The influence of the dead time control in the dq coordinates is expressed as follows by coordinate conversion.

$$V_{dDT} = \sqrt{\frac{2}{3}}\left\{V_{uDT}\cos\theta + V_{vDT}\cos\left(\theta-\frac{2}{3}\pi\right) + V_{wDT}\cos\left(\theta-\frac{4}{3}\pi\right)\right\} \tag{21}$$

$$V_{qDT} = \sqrt{\frac{2}{3}}\left\{-V_{uDT}\sin\theta - V_{vDT}\sin\left(\theta-\frac{2}{3}\pi\right) - V_{wDT}\sin\left(\theta-\frac{4}{3}\pi\right)\right\} \tag{22}$$

Here, $V_{dDT}$ is a d-axis dead time voltage, $V_{qDT}$ is a q-axis dead time voltage, $V_{uDT}$ is a U-phase dead time voltage, $V_{vDT}$ is a V-phase dead time voltage, $V_{wDT}$ is a W-phase dead time voltage, and $|V_{DT}|=|V_{uDT}|=|V_{vDT}|=|V_{wDT}|$.

Accordingly, the magnitude of the voltage fluctuation in the dq coordinates can be obtained in the following way.

$$\sqrt{V_{uDT}^2 + V_{qDT}^2} = \tag{23}$$

-continued $$\sqrt{\frac{2}{3}\left[\begin{array}{l}\left\{V_{uDT}\cos\theta + V_{vDT}\cos\left(\theta-\frac{2}{3}\pi\right) + V_{wDT}\cos\left(\theta-\frac{4}{3}\pi\right)\right\}^2 \\ \left\{-V_{uDT}\sin\theta - V_{vDT}\sin\left(\theta-\frac{2}{3}\pi\right) - V_{wDT}\sin\left(\theta-\frac{4}{3}\pi\right)\right\}^2\end{array}\right]} =$$

$$\sqrt{\frac{2}{3}(V_{uDT}^2 + V_{vDT}^2 + V_{wDT}^2 - V_{uDT}V_{vDT} - V_{vDT}V_{wDT} - V_{wDT}V_{uDT})}$$

Moreover, since all the $V_{uDT}$, $V_{vDT}$, and $V_{wDT}$ will not have the same sign, the following expression is satisfied.

$$-V_{uDT}V_{vDT} - V_{vDT}V_{wDT} - V_{wDT}V_{uDT} = V_{DT}^2 \tag{24}$$

By substituting this into the above Expression (23), the following expression is obtained.

$$\sqrt{V_{dDT}^2 + V_{qDT}^2} = \frac{2\sqrt{6}}{3}|V_{DT}| \tag{25}$$

That is, the voltage fluctuation which is $2\sqrt{6}/3$ times the phase voltage fluctuation $V_{DT}$ by the dead time control occurs in the dq coordinates by the influence of the dead time control.

Accordingly, an actual voltage actually applied to the electric motor 3 is shorter than the dq-axis voltage command values $V_{da}{}^*$ and $V_{qa}{}^*$ by the value of the above Expression (25). In order to offset this voltage shortage, a feedback loop including the d-axis current PI control unit 29$d$ and the q-axis current PI control unit 29$q$ will operate.

Thus, the limit voltage $V_{max}$ in the dq coordinates is determined like the above Expression (20A). Thereby, when a voltage shortage is offset by the feedback action, the voltage command values $V_{da}{}^*$ and $V_{qa}{}^*$ will be generated so as to be converged into the range of the limit voltage $V_{lim}$ (limit voltage before the influence of the dead time control is taken into consideration) for carrying out the sinusoidal driving in the dq coordinates.

The q-axis voltage $V_q$ and the d-axis voltage $V_d$ in a normal state are expressed as follows.

$$V_d = Ri_{da} - \omega L_q i_{qa}{}^* \tag{26}$$

$$V_q = Ri_{qa}{}^* + \omega L_d i_{da}{}^* + \omega\phi \tag{27}$$

If these are substituted into the above Expression (20A), the following Expression (28) is obtained.

$$\sqrt{(Ri_{qa}^* + \omega L_d i_{da}^* + \omega\varphi)^2 + (Ri_{da}^* - \omega L_q i_{qa}^*)^2} \leq V_{max} \tag{28}$$

When the magnetic-flux weakening control is not carried out, that is, when d-axis current command value $i_{da}{}^*=0$ is given, the condition in which the above Expression (28) is satisfied is the following Expression (29).

$$\sqrt{(Ri_{qa}^* + \omega\varphi)^2 + (-\omega L_q i_{qa}^*)^2} \leq V_{max} \tag{29}$$

If this is modified, it can be understood that the condition for carrying out the sinusoidal driving when the magnetic-flux weakening control is not carried out is given in the following Expression (30).

$$(R^2+L_q^2\omega^2)i_{qa}^{*2}+2R\phi\omega i_{qa}+\phi^2\omega^2-V_{max}^2 \leq 0 \tag{30}$$

On the other hand, when the above Expression (29) is not satisfied in $i_{da}{}^*=0$, that is, when the condition of the following Expression (31) is given, it is necessary to satisfy the above Expression (28) by setting d-axis current command value $i_{da}{}^* \neq 0$.

$$(R^2 + L_q^2 \omega^2) i_{qa}{}^{*2} + 2R\phi\omega i_{qa}{}^* + \phi^2\omega^2 - V_{max}^2 > 0 \quad (31)$$

Thus, if the above Expression (28) is solved concerning $i_{da}{}^*$, the following Expression (32) is obtained.

$$\frac{-B - \sqrt{B^2 - AC}}{A} \leq i_{da}^* \leq \frac{-B + \sqrt{B^2 - AC}}{A} \quad (32)$$

Here, in the above expression, $$A = R^2 + L_d^2 \omega^2,$$

$$B = R(L_d - L_q)\omega i_{qa}{}^* + L_d\phi\omega^2, \text{ and}$$

$$C = (R^2 + L_q^2 \omega^2) i_{qa}{}^{*2} + 2R\phi\omega i_{qa}{}^* + \phi^2\omega^2 - V_{max}^2$$

Since the motor efficiency is decreased as the absolute value of the d-axis current becomes larger, it is desirable that the absolute value which satisfies the condition of the above Expression (32) is set to the d-axis current command value $i_{da}{}^*$.

Since A>0 is apparent, and C>0 is satisfied from the above Expression (31), the following Expression (33) and Expression (34) are obtained.

$$\text{If } B > 0, \; i_{da}^* = \frac{-B + \sqrt{B^2 - AC}}{A} \quad (33)$$

$$\text{If } B < 0, \; i_{da}^* = \frac{-B - \sqrt{B^2 - AC}}{A} \quad (34)$$

In the above Expression (34), the d-axis current command value $i_{da}{}^*$ becomes a positive value, and a current flows in the direction in which the field of the d-axis is strengthened. Thus, when B<0, $i_{da}=0$ is satisfied.

Here, if $B^2 - AC \geq 0$ is satisfied, the value of the above Expression (34) becomes an imaginary number, $i_{da}{}^*$ which satisfies the above Expression (34) does not exist. That is, even if any d-axis current command value $i_{da}{}^*$ is set, it is not converged into the range of the limit voltage $V_{max}$ indicated by an inner circle of FIG. 10. Thus, if $B^2 - AC \geq 0$ is solved concerning $i_{da}{}^*$, and the following Expression (35) is obtained. This becomes a condition imposed on the q-axis current command value $i_{qa}{}^*$ in order to converge the d-axis voltage $V_d$ and the q-axis voltage $V_q$ into the range of the limit voltage $V_{lim}$ without being influenced by the dead time control, that is, in order to carry out the sinusoidal driving.

$$\frac{-E + \sqrt{E^2 - DF}}{D} \leq i_{da}^* \leq \frac{-E - \sqrt{E^2 - DF}}{D} \quad (35)$$

Here, in the above expression, $$D = R^2(L_d - L_q)^2 \omega^2 - (R^2 + L_d^2 \omega^2)(R^2 + L_q^2 \omega^2),$$

$$E = R(L_d - L_q)L_d\phi\omega^3 - (R^2 + L_d^2 \omega^2)R\phi\omega, \text{ and}$$

$$F = -R^2\phi^2\omega^2 + (R^2 + L_d^2 \omega^2)V_{max}^2.$$

Accordingly, the q-axis current command value $i_{qa}{}^*$ is limited to the range of the above Expression (35) in advance (Steps S4 to S7 of FIG. 9), and thereafter, the d-axis current command value $i_{da}{}^*$ may be obtained according to the above Expression (34) (Step S8 of FIG. 9). Thereby, a maximum output can be obtained within the range of the limit voltage $V_{lim}$ without being influenced by any voltage fluctuation by the dead time control. That is, it is possible to attain an increase in output without producing vibration even in the high-speed rotation region. Thereby, a steering feeling of the electric power steering apparatus can be improved.

Further, since the q-axis current command value $i_{qa}{}^*$ is limited in advance and the d-axis current command value $i_{da}{}^*$ corresponding to the q-axis current command value $i_{qa}{}^*$ is set, unlike WO2006/109809 which put a limit on the q-axis voltage command value afterwards, the q-axis current does not become variable.

Moreover, in the fourth embodiment, not the output voltage of the battery 50, but input voltage $V_b$ to the motor driver 9 is detected by the input voltage detecting unit 10, and the limit voltage $V_{max}$ is obtained using the detected input voltage $V_b$. For this reason, since a proper limit voltage $V_{max}$ can be set excluding the influence of a voltage drop in the relay 51 or coil 52, the output of the electric motor 3 can be increased without producing any vibration. If the limit voltage $V_{max}$ is obtained using the voltage of the battery as it is, its value becomes larger than a limit voltage $V_{max}$ using the input voltage $V_b$ to the motor driver 9. Therefore, there is a fear that the current command values $i_{da}{}^*$ and $i_{qa}{}^*$ is set within a range where the sinusoidal driving becomes impossible, and there is a fear that the vibration of the electric motor 3 is generated.

Further, for example, when the resistance value of the relay 51 is set to 1.5 mΩ, a voltage drop in the relay 51 becomes 0.075 V if the current is 50 A. In this case, the limit voltage Vmax in the dq coordinates becomes small as much as 0.048 V due to the voltage drop. Consequently, if the amount of weak magnetic flux (d-axis current command value ida*) is calculated using not the input voltage Vb to the motor driver 9, but the battery voltage, a loss is caused by 0.048 V. This loss can be secured by adopting a configuration in which the limit voltage Vmax is obtained on the basis of the input voltage Vb to the motor driver 9.

For example, if the resistance value of the electric motor 3 is set to 0.025Ω, the voltage loss of 0.048 V becomes the loss of about 2 A when converted into the q-axis current. In the electric motor 3 which becomes a driving source of the electric power steering apparatus, for example, the maximum value of the q-axis current becomes 90 A to 100 A. Accordingly, if the limit voltage $V_{max}$ is obtained using the battery voltage as it is, the output of about 2% is reduced. This problem is overcome by the configuration of this embodiment.

It stands to reason that modifications such as the second and third embodiments can be applied to the upper limit $i_{qa\_uplim}$ and the lower limit $i_{qa\_downlim}$ of the q-axis current command value $i_{qa}{}^*$ set by the dq-axis current command value calculating unit 26 in the configuration of FIG. 7 according to the fourth embodiment.

Although fourth embodiments of the invention have been described hitherto, the invention can be further implemented in other embodiments. For example, the upper limit $i_{qa\_uplim}$ of the q-axis current command value $i_{qa}{}^*$ when the magnetic-flux weakening control is carried out has only to be determined to a value between the characteristic L1+ and the characteristic L2+ in FIG. 2, and similarly, the lower limit $i_{qa\_downlim}$ of the q-axis current command value $i_{qa}{}^*$ when the magnetic-flux weakening control is carried out has only to be determined to a value between the characteristic L1⁻ and the characteristic L2⁻ in FIG. 2. Accordingly, for example, like characteristics L4⁺ and L4⁻ indicated by two-dotted chain lines in FIG. 2, characteristics in which the upper limit $i_{qa\_uplim}$ and the lower limit $i_{qa\_downlim}$ having lower absolute values than the characteristics L2⁺ and L2⁻ are set may be provided. Such characteristics L4⁺ and L4⁻ may be determined in consideration of variations (manufacture variations, temperature changes, variation across the ages, etc.) in characteristics of circuit elements, such as the motor driver 9, or fluctuations of the input voltage (battery voltage) such that the upper limit $i_{qa\_uplim}$ is converged between the characteristics L1⁺ and L2⁺ and the lower limit $i_{qa\_downlim}$ is converged between the characteristics L1⁻ and L2⁻ without depending on these variations or fluctuations. In this case, the characteristics L4⁺ and L4⁻ may be set by multiplying the right sides of the Expressions (3) and (4) or the Expressions (17) and (18) by an integer K (0<K<1) as shown in the following Expressions (36) and (37).

$$i_{qa\_up\,lim} = \frac{-E - \sqrt{E^2 - DF}}{D} \times K \quad (36)$$

$$i_{qa\_down\,lim} = \frac{-E + \sqrt{E^2 - DF}}{D} \times K \quad (37)$$

Here, K in the above expressions is an integer which satisfies 0<K<1.

Further, as indicated by two-dotted chain lines in FIGS. 1 and 7, the limit processing unit 30 may be provided between the current PI control units 29*d* and 29*q* and the dq/three-phase AC coordinate conversion unit 31 so as to put a limit on the q-axis voltage command value $V_{qa}$*, as in WO2006/109809. As mentioned above, since a limit is put on the q-axis current command value $i_{qa}$* in advance, the q-axis voltage command value $V_{qa}$* and the d-axis voltage command value $V_{da}$* are seldom set to values which exceed the limit voltage $V_{lim}$ in the dq coordinates. However, the sinusoidal driving can be more reliably carried out by providing the limit processing unit 30.

Further, in the fourth embodiment, a voltage developed in the feed line 53 between the coil 52 and the motor driver 9 is detected by the input voltage detecting unit 10. However, for example, a booster circuit may be further interposed between the coil 52 and the motor driver 9. In this case, it is desirable that the input voltage detecting unit 10 is connected between the booster and the motor driver 9 so as to detect the input voltage $V_b$ to the motor driver 9.

Moreover, in the aforementioned embodiments, an example in which the invention is applied to the electric power steering apparatus has been described. However, the invention is not limited to the control of the motor as a driving source of the electric power steering apparatus, and can be easily expanded and applied to control of motors for other arbitrary purposes.

In addition, various design changes can be made within the scope of the matters defined in the claims.

What is claimed is:

1. A motor control device for controlling a d-axis current and a q-axis current on dq coordinates to control a motor, comprising:
a q-axis current command value setting unit which sets a q-axis current command value;
an upper limit/lower limit setting unit which sets an upper limit and a lower limit of the q-axis current;
a comparing unit which compares the q-axis current command value set by the q-axis current command value setting unit and the upper limit and the lower limit set by the upper limit/lower limit setting unit;
a q-axis current command value limiting unit which puts a limit on the q-axis current command value in accordance with a comparison result by the comparing unit; and
a d-axis current command value setting unit which sets a d-axis current command value, on the basis of the q-axis current command value which is limited by the q-axis current command value limiting unit,
wherein the upper limit/lower limit setting unit sets the upper limit and the lower limit in accordance with a rotational angular velocity of the motor,
wherein the upper limit/lower limit setting unit determines the upper limit so as to satisfy the following Expression (A), and determines the lower limit so as to satisfy the following Expression (B); wherein:

$$i_{qa\_up\,lim} \leq \frac{-E - \sqrt{E^2 - DF}}{D} \quad (A)$$

$$i_{qa\_down\,lim} = \frac{-E + \sqrt{E^2 - DF}}{D} \quad (B)$$

$$D = R^2(L_d - L_q)^2\omega^2 - (R^2 + L_d^2\omega^2)(R^2 + L_q^2\omega^2),$$
$$E = R(L_d - L_q)L_d\varphi\omega^3 - (R^2 + L_d^2\omega^2)R\varphi\omega,$$
and
$$F = -R^2\varphi^2\omega^2 + (R^2 + L_d^2\omega^2)V_{lim}^2,$$

$i_{qa\_uplim}$ is a q-axis current upper limit,
$i_{qa\_downlim}$ is a q-axis current lower limit,
R is a stator winding resistance of the motor,
φ is a magnetic flux on dq coordinates calculated from the interlinking magnetic flux of a stator caused by a field,
ω is the rotational angular velocity at an electric angle of the motor,
$L_d$ is d-axis inductance,
$L_q$ is q-axis inductance, and
$V_{lim}$ is a limit voltage in the dq coordinates where sinusoidal driving is allowed.

2. The motor control device according to claim 1, wherein the upper limit/lower limit setting unit determines the upper limit in accordance with the following Expression (A1), and determines the lower limit in accordance with the following Expression (B1), wherein:

$$i_{qa\_up\,lim} = \frac{-E - \sqrt{E^2 - DF}}{D} \quad (A1)$$

$$i_{qa\_down\,lim} = \frac{-E + \sqrt{E^2 - DF}}{D}. \quad (B1)$$

3. The motor control device according to claim 2, wherein the d-axis current command value setting unit sets the d-axis current command value in accordance with the following Expression (C), wherein:

$$\frac{-B - \sqrt{B^2 - AC}}{A} \leq i_{da}^* \leq \frac{-B + \sqrt{B^2 - AC}}{A} \quad (C)$$

$$A = R^2 + L_d^2\omega^2,$$

-continued $$B = R(L_d - L_q)\omega i_{qa}^* + L_d\varphi\omega^2, \text{ and}$$

$$C = (R^2 + L_q^2\omega^2)i_{qa}^{*2} + 2R\varphi\omega i_{qa}^* + \varphi^2\omega^2 - V_{lim}^2,$$

$i_{da}^*$ is a d-axis current command value, and
$i_{qa}^*$ is a q-axis current command value.

4. The motor control device according to claim 3, wherein the d-axis current command value setting unit sets a d-axis current command value in accordance with the following Expression (C1), $$i_{da}^* = \frac{-B + \sqrt{B^2 - AC}}{A}. \tag{C1}$$

5. A motor control device for controlling a d-axis current and a q-axis current on dq coordinates to control a motor, comprising:
  a q-axis current command value setting unit which sets a q-axis current command value;
  an upper limit/lower limit setting unit which sets an upper limit and a lower limit of the q-axis current;
  a comparing unit which compares the q-axis current command value set by the q-axis current command value setting unit and the upper limit and the lower limit set by the upper limit/lower limit setting unit;
  a q-axis current command value limiting unit which puts a limit on the q-axis current command value in accordance with a comparison result by the comparing unit; and
  a d-axis current command value setting unit which sets a d-axis current command value, on the basis of the q-axis current command value which is limited by the q-axis current command value limiting unit,
  further comprising:
  a command value calculating unit which calculates a command value for carrying out magnetic-flux weakening control of the motor on the basis of a limit voltage, wherein a voltage fluctuation resulting from dead time control which simultaneously turns off upper switching elements and lower switching elements of a driving circuit for driving the motor is added to the limit voltage; and
  a control signal generating unit which generates a control signal for carrying out ON/OFF control and the dead time control of the upper switching elements and the lower switching elements of the driving circuit.

6. The motor control device according to claim 5, wherein the motor is a three-phase motor;
  wherein the limit voltage to which the voltage fluctuation resulting from the dead time control is added is a limit voltage in dq coordinates; and
  wherein the limit voltage has a value obtained by subtracting $2\sqrt{6}/3$ times or more a fluctuation absolute value of each phase voltage resulting from the dead time control, from a limit voltage in the dq coordinates to which the voltage fluctuation resulting from the dead time control is not added.

7. The motor control device according to claim 5, wherein the q-axis current command value limiting unit puts the limit on the q-axis current command value set by the q-axis current command value setting unit, on the basis of the limit value to which the voltage fluctuation resulting from the dead time control is added.

8. The motor control device according to claim 5, further comprising:
  a limit voltage setting unit which sets the limit value to which the voltage fluctuation resulting from the dead time control is added, on the basis of an input voltage to the driving circuit.

9. The motor control device according to claim 1, wherein the upper limit/lower limit setting unit determines the upper limit in accordance with the following Expression (A1), and determines the lower limit in accordance with the following Expression (B1), wherein:

$$i_{qa\_up\,lim} < \frac{-E - \sqrt{E^2 - DF}}{D} \tag{A1}$$

$$i_{qa\_down\,lim} > \frac{-E + \sqrt{E^2 - DF}}{D}. \tag{B1}$$

* * * * *